(12) United States Patent
Blankespoor et al.

(10) Patent No.: US 9,387,896 B1
(45) Date of Patent: Jul. 12, 2016

(54) SLIP AVOIDANCE

(71) Applicant: Google Inc., Mountain View, CA (US)

(72) Inventors: Kevin Blankespoor, Arlington, MA (US); Alex Perkins, Arlington, MA (US); Marco da Silva, Arlington, MA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/468,031

(22) Filed: Aug. 25, 2014

(51) Int. Cl.
*G06F 19/00* (2011.01)
*B62D 57/032* (2006.01)

(52) U.S. Cl.
CPC .............. *B62D 57/032* (2013.01); *Y10S 901/01* (2013.01); *Y10S 901/46* (2013.01)

(58) Field of Classification Search
CPC ................... A61F 2002/5004; A61F 2002/503; A61F 2002/5033; A61F 2002/5075; A61F 2002/6818
USPC ............................ 700/245; 623/24, 47, 50, 53
See application file for complete search history.

(56) References Cited

U.S. PATENT DOCUMENTS

| 5,151,859 | A | 9/1992 | Yoshino et al. |
| 5,644,204 | A | 7/1997 | Nagle |
| 7,949,430 | B2 | 5/2011 | Pratt et al. |
| 8,060,253 | B2 | 11/2011 | Goswami et al. |
| 2011/0257764 | A1* | 10/2011 | Herr .......................... A61F 2/60 623/24 |
| 2012/0203359 | A1* | 8/2012 | Schimmels ........... A61F 2/6607 623/55 |
| 2012/0316684 | A1 | 12/2012 | Lee et al. |

OTHER PUBLICATIONS

Silva et al., Towards Force Interaction Control of Biped Walking Robots, 2004, IEEE, p. 2568-2573.*
Hashlamon et al., Simple Virtual Slip Force Sensor for Walking Biped Robots, 2013, IEEE, p. 1-5.*
Kim et al., Landing Force Controller for a Humanoid Robot: Time-Domain Passivity Approach, 2006, IEEE, p. 4237-4242.*
Silva et al., Goal-Oriented Biped Walking Based on Force Interaction Control, 2001, IEEE, p. 4122-4127.*
Abe, Yeuhi; Da Silva, Marco; Popovic, Jovan; "Multiobjective Control with Frictional Contacts", Association for Computing Machinery, Inc. SIGGRAPH Symposium on Computer Animation, Aug. 4-5, 2007, San Diego, California.

* cited by examiner

*Primary Examiner* — McDieunel Marc
(74) *Attorney, Agent, or Firm* — McDonnell, Boehnen, Hulbert & Berghoff LLP

(57) ABSTRACT

An example method may include i) determining, by a robot having at least one foot, a representation of a coefficient of friction between the foot and a ground surface; ii) determining, by the robot, a representation of a gradient of the ground surface; iii) based on the determined representations of the coefficient of friction and the gradient, determining a threshold orientation for a target ground reaction force on the foot of the robot during a step; iv) determining the target ground reaction force, where the target ground reaction force comprises a magnitude and an orientation; v) determining an adjusted ground reaction force by adjusting the orientation of the target ground reaction force to be within the determined threshold orientation; and vi) causing the foot of the robot to apply a force on the ground surface equal to and opposing the adjusted ground reaction force during the step.

20 Claims, 21 Drawing Sheets

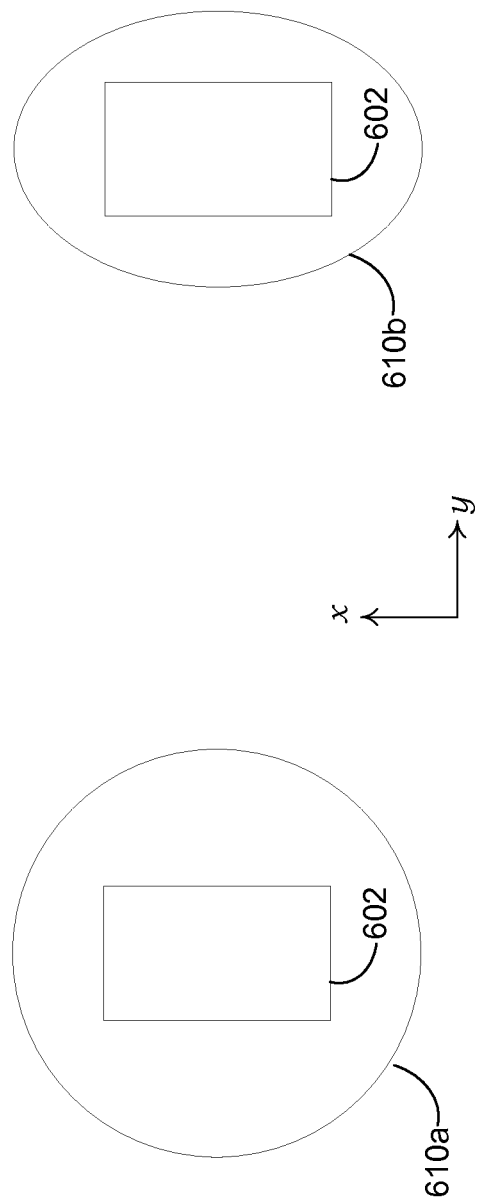

SLIP AVOIDANCE

GOVERNMENT LICENSE RIGHTS

This invention was made with government support under HR00011-10-C-0025 awarded by the Defense Advanced Research Projects Agency. The government has certain rights in the invention.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly.

SUMMARY

The present disclosure generally relates to systems and methods for controlling a legged robot. Specifically, implementations described herein may allow for efficient operation of a legged robot that encounters rough or uneven terrain. These as well as other aspects, advantages, and alternatives will become apparent to those of ordinary skill in the art by reading the following detailed description, with reference where appropriate to the accompanying drawings.

A first example implementation may include i) determining, by a robot having at least one foot, a representation of a coefficient of friction between the foot and a ground surface; ii) determining, by the robot, a representation of a gradient of the ground surface; iii) based on the determined representations of the coefficient of friction and the gradient, determining a threshold orientation for a target ground reaction force on the foot of the robot during a step; iv) determining the target ground reaction force, where the target ground reaction force comprises a magnitude and an orientation; v) determining an adjusted ground reaction force by adjusting the orientation of the target ground reaction force to be within the determined threshold orientation; and vi) causing the foot of the robot to apply a force on the ground surface approximately equal to and opposing the adjusted ground reaction force during the step.

A second example implementation may include a system having means for i) determining, by a robot having at least one foot, a representation of a coefficient of friction between the foot and a ground surface; ii) determining, by the robot, a representation of a gradient of the ground surface; iii) based on the determined representations of the coefficient of friction and the gradient, determining a threshold orientation for a target ground reaction force on the foot of the robot during a step; iv) determining the target ground reaction force, where the target ground reaction force comprises a magnitude and an orientation; v) determining an adjusted ground reaction force by adjusting the orientation of the target ground reaction force to be within the determined threshold orientation; and vi) causing the foot of the robot to apply a force on the ground surface approximately equal to and opposing the adjusted ground reaction force during the step.

In another aspect, a robot is provided. The robot may include i) at least one foot; ii) a processor; iii) a non-transitory computer readable medium; and iv) program instructions stored on the non-transitory computer readable medium that, when executed by the processor, cause the robot to perform functions comprising a) determining, by the robot, a representation of a coefficient of friction between the foot and a ground surface; b) determining, by the robot, a representation of a gradient of the ground surface; c) based on the determined representations of the coefficient of friction and the gradient, determining a threshold orientation for a target ground reaction force on the foot of the robot during a step; d) determining the target ground reaction force, where the target ground reaction force comprises a magnitude and an orientation; e) determining an adjusted ground reaction force by adjusting the orientation of the target ground reaction force to be within the determined threshold orientation; and f) causing the foot of the robot to apply a force on the ground surface equal to and opposing the adjusted ground reaction force during the step.

BRIEF DESCRIPTION OF THE DRAWINGS

FIG. 6B illustrates another threshold orientation of a ground reaction force, according to an example implementation.

DETAILED DESCRIPTION

Figure 1:
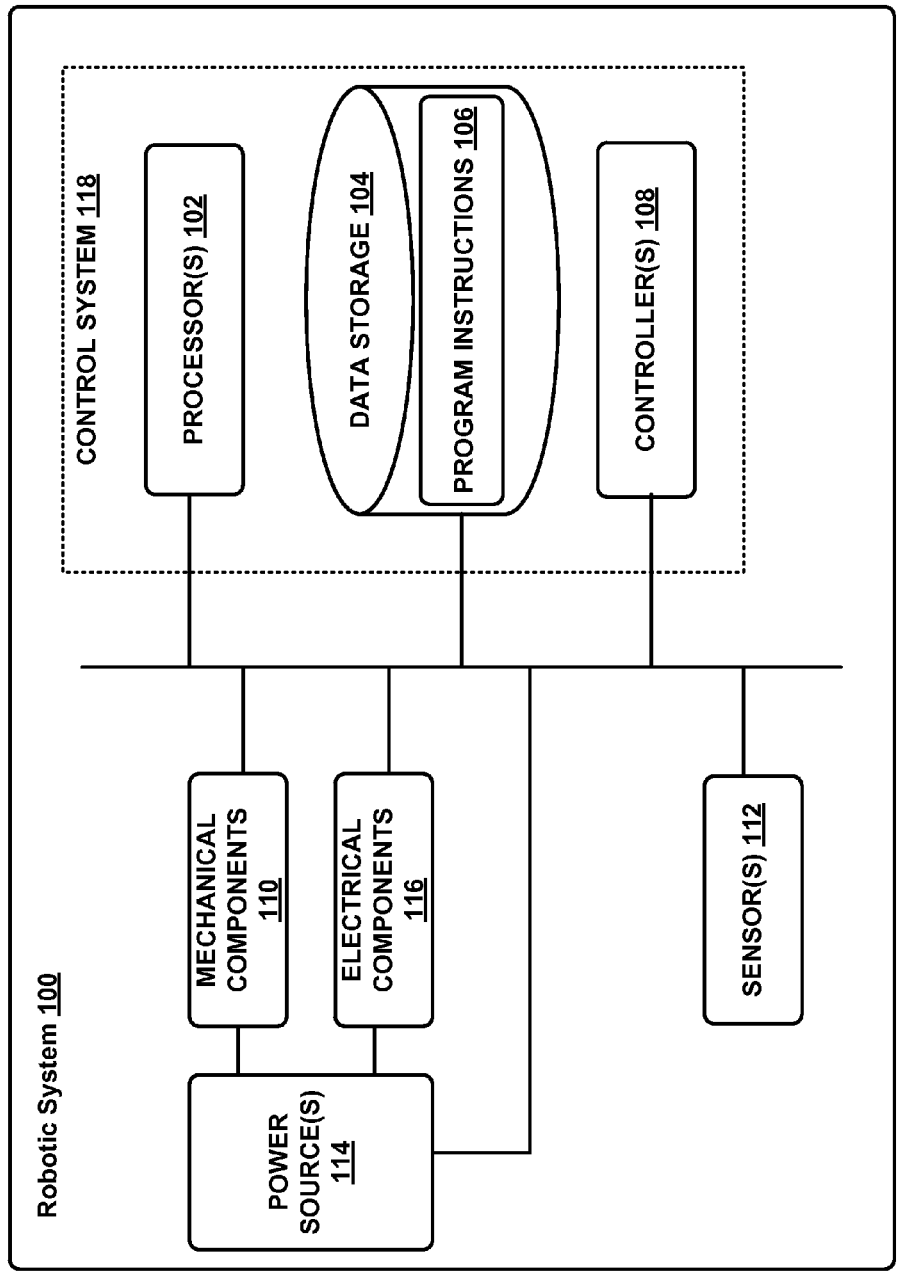
FIG. 1 illustrates a configuration of a robotic system, according to an example implementation.

Example apparatuses, systems and methods are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein and illustrated in the Figures, can be arranged, substituted, combined, separated, and designed in a wide variety of different configurations, all of which are contemplated herein. Further, unless otherwise noted, Figures are not drawn to scale and are used for illustrative purposes only. Moreover, the Figures are representational only and not all components are shown. For example, additional structural or restraining components might not be shown.

I. OVERVIEW

Example implementations relate to the control of legged robots. In particular, example implementations may relate to methods for controlling a legged robot by attempting to avoid slips of the robot's feet, detecting slips that do occur, and handling and/or responding to detected slips and other disturbances to a gait of the robot.

An example robot may detect, via one or more force sensors, a ground reaction force that acts upon each leg of the robot that is in contact with a ground surface. The ground reaction force is the force exerted on the robot by the ground surface, opposing the robot's actions upon the ground surface. For example, when a robot moves forward by pushing off of the ground with its leg(s), the ground reaction force propels the robot in the appropriate direction. The ground reaction force may include a normal force component that acts perpendicular to the ground surface. In some cases, the ground reaction force may also include a friction force component that acts parallel to the ground surface.

By controlling the actuation and position of its leg(s), the robot may control the forces it exerts on the ground, and thereby control the ground reaction forces that act upon the robot. Controlling the ground reaction forces may allow the robot to control its position, velocity, and acceleration, and to move at a desired gait while maintaining its balance. Further, control of the ground reaction forces may allow the robot to correct errors that the robot might detect in its gait. For example, the robot may detect unintended lateral velocity in the robot's gait based on contact with an obstacle, among other causes. In response, the robot may determine a position and load for its leg(s) that causes a ground reaction force to act upon the robot that opposes and corrects the velocity error. Similarly, the robot may detect an unintended rotation about its roll axis and cause a ground reaction force to act upon the robot to correct the roll error. Other types of errors and corrections are also possible.

This manner of ground reaction force control may further be utilized to avoid slips of a robot's feet. In some examples, the robot may determine a value for a coefficient of friction between its feet and the ground surface, and a value for the gradient of the ground surface. These values may be used to further determine a threshold orientation for a given ground reaction force, defining the maximum friction force based on its direct relationship to the normal force.

The threshold orientation may be approximated by a cone centered on the normal force and pointed perpendicular to the ground surface. Thus, a ground reaction force outside of the friction cone would require more friction than is available, and may result in a slip of the robot's foot. Accordingly, when the robot determines a target ground reaction force for a given foot, it may adjust the orientation of the target ground reaction force to be within the allowable friction cone.

In some cases, the robot may determine two different threshold orientations for the ground reaction force during the same step. For example, the robot may use a smaller friction cone during the early stages of a step, requiring less friction and allowing the robot to establish its foothold. The robot may then expand the friction cone later in the step, allowing the robot to adjust the orientation of the ground reaction force to seek more friction from the ground surface.

An example robot may be configured to detect when slips of its feet occur. For instance, some robots may have two feet on the ground at the same time for a given gait, such as a quadruped robot that is moving at a trotting gait. The robot may, via sensors in its legs, be able to determine the positions of its feet. Based on this determination, the robot may be able to further determine the distance between its feet during a given step. If the feet maintain ground contact and do not slip, the distance between them should not change. Thus, the robot may monitor the distance between the pair of feet throughout the step, and any deviation from the starting distance that exceeds a certain threshold may indicate that a significant slip has occurred, and the robot may react accordingly.

Other methods of detecting slips of a robot's foot are possible as well. For instance, the robot may compare two different estimates of the position of the robot's body. The first estimate may determine the position of the robot's body in relation to a foot based on kinematic odometry. If it is assumed that the foot is in continuous contact with the ground and does not slip, then the position of the robot's body with respect to the foot may approximate the body's position with respect to the ground.

The second estimate may be based on an inertial measurement of the robot's body, without regard to the stance position of the robot's foot. When the two estimates, determined at approximately the same time(s), are compared, they may be approximately equal if the assumption underlying the first estimate is true. If the estimates differ by an amount greater than a certain threshold, it may indicate that the assumption is not true, and that a significant slip of the robot's foot may have occurred. The robot may react accordingly. Further, a robot may utilize either or both of the methods for detecting slips described herein, among other techniques.

Some robots may operate in gaits that control the state changes of the legs of the robot based on a timer. For instance, a biped robot may operate in a timer-based walking gait where the feet of the robot contact the ground surface and remain in the stance state for one-half of a second, then lift off of the ground and swing forward for one-half of a second before stepping down again. Alternatively, an example robot may operate in a gait that is at least partially mechanically timed. For instance, the robot may determine when to end a given state of the robot's foot based on data that is received by the robot. As an example, the robot may determine when to end a stance state for a first foot based on an indication that a second foot that was previously in a swing state has made contact with the ground surface. Other indications that cause the robot to change states may be possible.

Further, an example robot operating in a mechanically timed gait may react in various ways to handle disturbances to the gait. A slip of the robot's foot might be one type of disturbance. Another might be an indication that a stance leg has reached a range of motion limit of an actuator in one of its joints, limiting the actuator's range of movement and possibly limiting its control of the robot's gait. For example, the robot may cause a swinging leg to end its swing early and make contact with the ground surface if the robot detects a disturbance to a stance leg.

As another example, the robot may react to an indication that a leg in a swing state has contacted the ground surface earlier than anticipated based on a target swing trajectory that was determined for the foot. This may occur relatively frequently when the robot encounters uneven terrain, and may indicate that the robot is beginning to walk up an incline, or surmount an obstacle. The robot may adjust its gait, among other possible reactions, to compensate for the early ground contact.

In other examples, the robot may react to an indication that a leg in a swing state has not contacted the ground surface within an anticipated time. The anticipated time may be based on the target swing trajectory that was determined for the foot. Again, this may occur relatively frequently when the robot encounters uneven terrain, and may indicate that the robot is beginning to walk down an incline, or has stepped off of a ledge. The robot may adjust its gait, among other possible reactions, to compensate for the late ground contact.

II. EXAMPLE ROBOTIC SYSTEMS

Referring now to the figures, FIG. 1 illustrates an example configuration of a robotic system. The robotic system 100 represents an example robotic system configured to perform the methods described herein. Additionally, the robotic system 100 may be configured to operate autonomously, semi-autonomously, and/or using directions provided by user(s), and may exist in various forms, such as a humanoid robot or a quadruped robot, among other examples. Furthermore, the robotic system 100 may also be referred to as a robotic device, mobile robot, or robot, among others.

As shown in FIG. 1, the robotic system 100 may include processor(s) 102, data storage 104, program instructions 106, and controller(s) 108, which together may be part of a control system 118. The robotic system 100 may also include sensor(s) 112, power source(s) 114, mechanical components 110, and electrical components 116. Note that the robotic system 100 is shown for illustration purposes as robotic system 100 and may include more or less components within examples without departing from the scope of the invention. The various components of robotic system 100 may be connected in any manner, including wired or wireless connections, etc. Further, in some examples, components of the robotic system 100 may be positioned on multiple entities rather than a single entity. Other example illustrations of robotic system 100 may exist as well.

Processor(s) 102 may operate as one or more general-purpose processors or special purpose processors (e.g., digital signal processors, application specific integrated circuits, etc.). The processor(s) 102 may be configured to execute computer-readable program instructions 106 that are stored in the data storage 104 and are executable to provide the operations of the robotic system 100 described herein. For instance, the program instructions 106 may be executable to provide functionality of controller(s) 108, where the controller(s) 108 may be configured to cause activation and deactivation of the mechanical components 110 and the electrical components 116.

The data storage 104 may exist as various types of storage configured to hold memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices, which may communicate via wired or wireless communication. Further, in addition to the computer-readable program instructions 106, the data storage 104 may include additional data such as diagnostic data, among other possibilities.

The robotic system 100 may include at least one controller 108, which may interface with the robotic system 100. The controller 108 may serve as a link between portions of the robotic system 100, such as a link between mechanical components 110 and/or electrical components 116. In some instances, the controller 108 may serve as an interface between the robotic system 100 and another computing device. Further, the controller 108 may serve as an interface between the robotic system 100 and a user(s). The controller 108 may include various components for communicating with the robotic system 100, including a joystick(s), buttons, among others. The example interfaces and communications noted above may be implemented via a wired or wireless connection, or both. The controller 108 may perform other functions for the robotic system 100 as well. Other examples of controllers may exist as well.

Mechanical components 110 represent possible hardware of the robotic system 100 that may enable the robotic system 100 to operate and perform physical operations. As a few examples, the robotic system 100 may include actuator(s), extendable leg(s) ("legs"), arm(s), wheel(s), one or more structured bodies for housing the computing system or other components, and other mechanical components. The mechanical components 110 may depend on the design of the robotic system 100 and may also be based on the functions and/or tasks the robotic system 100 may be configured to perform. As such, depending on the operation and functions of the robotic system 100, different mechanical components 110 may be available for the robotic system 100 to utilize. In some examples, the robotic system 100 may be configured to add and/or remove mechanical components 110, which may involve assistance from a user and/or other robot. For example, the robotic system 100 may be initially configured with four legs, but may be altered by a user or the robotic system 100 to remove two of the four legs to operate as a biped. Other examples of mechanical components 110 may be included within some implementations.

Additionally, the robotic system 100 may include one or more sensor(s) 112 arranged to sense aspects of the robotic system 100. The sensor(s) 112 may include one or more force sensors arranged to measure load on various components of the robotic system 100. In an example, the sensor(s) 112 may include one or more force sensors on each leg. Such force sensors on the legs may measure the load on the actuators that move one or more members of the leg.

The sensor(s) 112 may further include one or more position sensors. Position sensors may sense the position of the actuators of the robotic system. In one implementation, position sensors may sense the extension, retraction, or rotation of the actuators on the legs of the robot. The sensor(s) 112 may further include one or more velocity and/or acceleration sensors. For instance, the sensor(s) 112 may include an inertial measurement unit (IMU). The IMU may sense velocity and acceleration in the world frame, with respect to the gravity vector. The velocity and acceleration of the IMU may then be translated to the robotic system, based on the location of the IMU in the robotic system and the kinematics of the robotic system. Other sensor(s) 112 are also possible, including proximity sensors, motion sensors, load sensors, touch sensors, depth sensors, ultrasonic range sensors, and infrared sensors, among other possibilities.

The sensor(s) 112 may provide sensor data to the processor(s) 102 to allow for appropriate interaction of the robotic system 100 with the environment as well as monitoring of operation of the systems of the robotic system 100. The sensor data may be used in evaluation of various factors for activation and deactivation of mechanical components 110 and electrical components 116 by controller 108 and/or a computing system of the robotic system 100.

The sensor(s) 112 may provide information indicative of the environment of the robot for the controller 108 and/or computing system to use to determine operations for the robotic system 100. For example, the sensor(s) 112 may capture data corresponding to the terrain of the environment or location of nearby objects, which may assist with environment recognition and navigation, etc. In an example configuration, the robotic system 100 may include a sensor system that includes RADAR, LIDAR, SONAR, VICON®, one or more cameras, a global positioning system (GPS) transceiver, and/or other sensors for capturing information of the environment of the robotic system 100. The sensor(s) 112 may monitor the environment in real-time and detect obstacles, elements of the terrain, weather conditions, temperature, and/or other parameters of the environment for the robotic system 100.

Further, the robotic system 100 may include other sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The sensor data provided by the sensors may enable the computing system of the robotic system 100 to determine errors in operation as well as monitor overall functioning of components of the robotic system 100. For example, the computing system may use sensor data to determine a stability of the robotic system 100 during operations as well as measurements related to power levels, communication activities, components that require repair, among other information. As an example configuration, the robotic system 100 may include gyroscope(s), accelerometer(s), and/or other possible sensors to provide sensor data relating to the state of operation of the robot. Further, sensor(s) 112 may also monitor the current state of a function, such as a gait, that the robotic system 100 may currently be operating. Other example uses for the sensor(s) 112 may exist as well.

Additionally, the robotic system 100 may also include one or more power source(s) 114 configured to supply power to various components of the robotic system 100. Among possible power systems, the robotic system 100 may include a hydraulic system, electrical system, batteries, and/or other types of power systems. As an example illustration, the robotic system 100 may include one or more batteries configured to provide charge to components that may receive charge via a wired and/or wireless connection. Within examples, components of the mechanical components 110 and electrical components 116 may each connect to a different power source or may be powered by the same power source. Components of the robotic system 100 may connect to multiple power sources 114 as well.

Within example configurations, any type of power source may be used to power the robotic system 100, such as a gasoline engine. Further, the power source(s) 114 may charge using various types of charging, such as wired connections to an outside power source, wireless charging, combustion, or other examples. Additionally, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system of the robotic system 100 may transfer a large amount of power through small tubes, flexible hoses, or other links between components of the robotic system 100. Other power sources may be included within the robotic system 100 within examples.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various functions. The electrical components 116 may be configured to provide power from the power source(s) 114 to the various mechanical components 110, for example. Further, the robotic system 100 may include electric motors. Other examples of electrical components 116 may exist as well.

Figure 2:
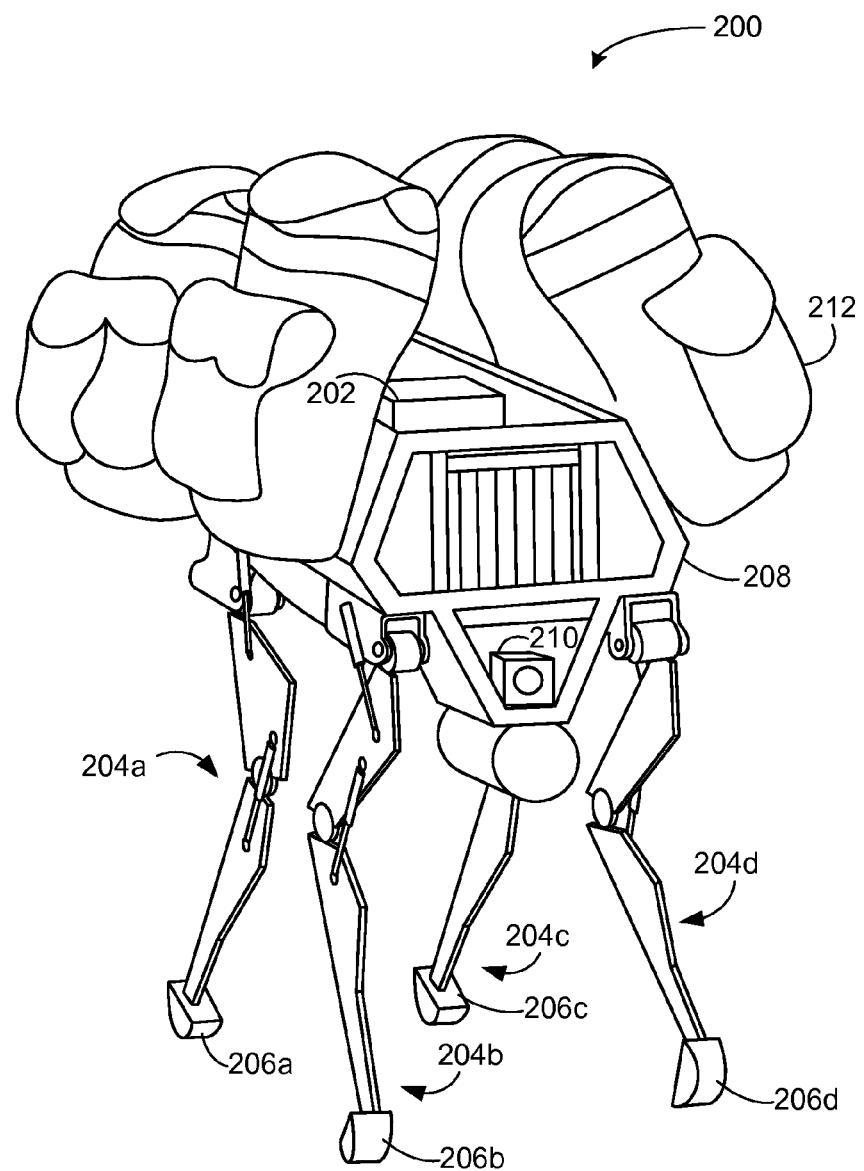
FIG. 2 illustrates a quadruped robot, according to an example implementation.

FIG. 2 illustrates an example quadruped robot 200, according to an example implementation. Among other possible functions, the robot 200 may be configured to perform some of the methods described herein during operation. The robot 200 includes a control system 202, legs 204a, 204b, 204c, 204d connected to a body 208. Each leg may include a foot 206a, 206b, 206c, 206d, that may contact the ground surface. The robot 200 may also include sensors (e.g., sensor 210) configured to provide sensor data to the control system 202 of the robot 200. Further, the robot 200 is illustrated carrying a load 212 on the body 208. Within other example implementations, the robot 200 may include more or less components and may additionally include components not shown in FIG. 2.

The robot 200 may be a physical representation of the robotic system 100 shown in FIG. 1 or may be based on other configurations. To operate, the robot 200 includes a computing system that may be made up of one or more computing devices configured to assist in various operations of the robot 200, which may include processing data and providing outputs based on the data. The computing system may process information provided by various systems of the robot 200 (e.g., a sensor system) or from other sources (e.g., a user, another robot, a server) and may provide instructions to the systems to operate in response.

Additionally, the computing system may monitor systems of the robot 200 during operation, to determine errors and/or monitor regular operation, for example. In some example configurations, the computing system may serve as a connection between the various systems of the robot 200 that coordinates the operations of the systems together to enable the robot 200 to perform functions. Further, although the operations and methods described herein correspond to a computing system of a robot performing tasks, the computing system may be made of multiple devices, processors, controllers, and/or other entities configured to assist in the operation of the robot. Additionally, the computing system may operate using various types of memory and/or other components.

Although the robot 200 includes four legs 204a-204d in the illustration shown in FIG. 2, the robot 200 may include more or less legs within other examples. Further, the configuration, position, and/or structure of the legs 204a-204d may vary in example implementations. The legs 204a-204d enable the robot 200 to move and may be configured to operate in multiple degrees of freedom to enable different techniques of travel to be performed. In particular, the legs 204a-204d may enable the robot 200 to travel at various speeds through mechanically controlling the legs 204a-204d according to the mechanics set forth within different gaits. A gait is a pattern of movement of the limbs of an animal, robot, or other mechanical structure. As such, the robot 200 may navigate by operating the legs 204a-204d to perform various gaits that the robot 200 is configured to perform. The robot 200 may use a variety gaits to travel within an environment, which may involve selecting a gait based on speed, terrain, the need to maneuver, and/or energy efficiency.

Further, different types of robots may use different gaits due to differences in design that may prevent use of certain gaits. Although some gaits may have specific names (e.g., walk, trot, run, bound, gallop, etc.), the distinctions between gaits may overlap with some gaits having slight variations. The gaits may be classified based on footfall patterns, also known as the locations on the ground surface for the placement the feet 206a-206d. Similarly, gaits may also be classified based on mechanics. One or more systems of the robot 200, such as the control system 118, may be configured to operate the legs 204a-204d to cause the robotic 200 to move. Additionally, the robot 200 may include other mechanical components, which may be attached to the robot 200 at various positions. The robot 200 may include mechanical arms, grippers, or other features. In some examples, the legs 204a-204d may have other types of mechanical features that enable control upon various types of surfaces that the robot may encounter, such as wheels, etc. Other possibilities also exist.

As part of the design of the example robot 200, the body 208 of the robot 200 connects to the legs 204a-204d and may house various components of the robot 200. As such, the structure of the body 208 may vary within examples and may further depend on particular functions that a given robot may have been designed to perform. For example, a robot developed to carry heavy loads may have a wide body that enables placement of the load. Similarly, a robot designed to reach high speeds may have a narrow, small body that does not have substantial weight. Further, the body 208 as well as the legs 204 may be developed using various types of materials, such as various metals or plastics. Within other examples, a robot may have a body with a different structure or made of other types of materials.

The sensor(s) 210 of the robot 200 may include various types of sensors, such as the camera or sensing system shown in FIG. 2. The sensor(s) 210 is positioned on the front of the body 208, but may be placed at other positions of the robot as well. As described for the robotic system 100, the robot 200 may include a sensory system that includes force sensors, positions sensors, IMUs, RADAR, LIDAR, SONAR, VICON®, GPS, force sensors, accelerometer(s), gyroscope(s), and/or other types of sensors. The sensor(s) 210 may be configured to measure parameters of the environment of the robot 200 as well as monitor internal operations of systems of the robot 200. As an example illustration, the robot 200 may include sensors that monitor the accuracy of its systems to enable the computing system to detect a system within the robot 100 that may be operating incorrectly. Other uses of the sensor(s) 210 may be included within examples.

The load 212 carried by the robot 200 may represent various types of cargo that the robot 200 may transport. The load 212 may also represent external batteries or other types of power sources (e.g., solar panels) that the robot 200 may utilize. The load 212 represents one example use for which the robot 212 may be configured. The robot 200 may be configured to perform other operations as well.

Additionally, as shown with the robotic system 100, the robot 200 may also include various electrical components that may enable operation and communication between the mechanical features of the robot 200. Also, the robot 200 may include one or more computing systems that include one or more processors configured to perform various functions, including processing inputs to provide control over the operation of the robot 200. The computing system may include additional components, such as various types of storage and a power source, etc.

During operation, the computing system may communicate with other systems of the robot 200 via wired or wireless connections and may further be configured to communicate with one or more users of the robot. As one possible illustration, the computing system may receive an input from a user indicating that the user wants the robot to perform a particular gait in a given direction. The computing system may process the input and may perform an operation that may cause the systems of the robot to perform the requested gait. Additionally, the robot's electrical components may include interfaces, wires, busses, and/or other communication links configured to enable systems of the robot to communicate.

Furthermore, the robot 200 may communicate with one or more users and/or other robots via various types of interfaces. In an example implementation, the robot 200 may receive input from a user via a joystick or similar type of interface. The computing system may be configured to measure the amount of force and other possible information from inputs received from a joystick interface. Similarly, the robot 200 may receive inputs and communicate with a user via other types of interfaces, such as a mobile device or a microphone. The computing system of the robot 200 may be configured to process the various types of inputs that the robot 200 may receive.

Figure 3:
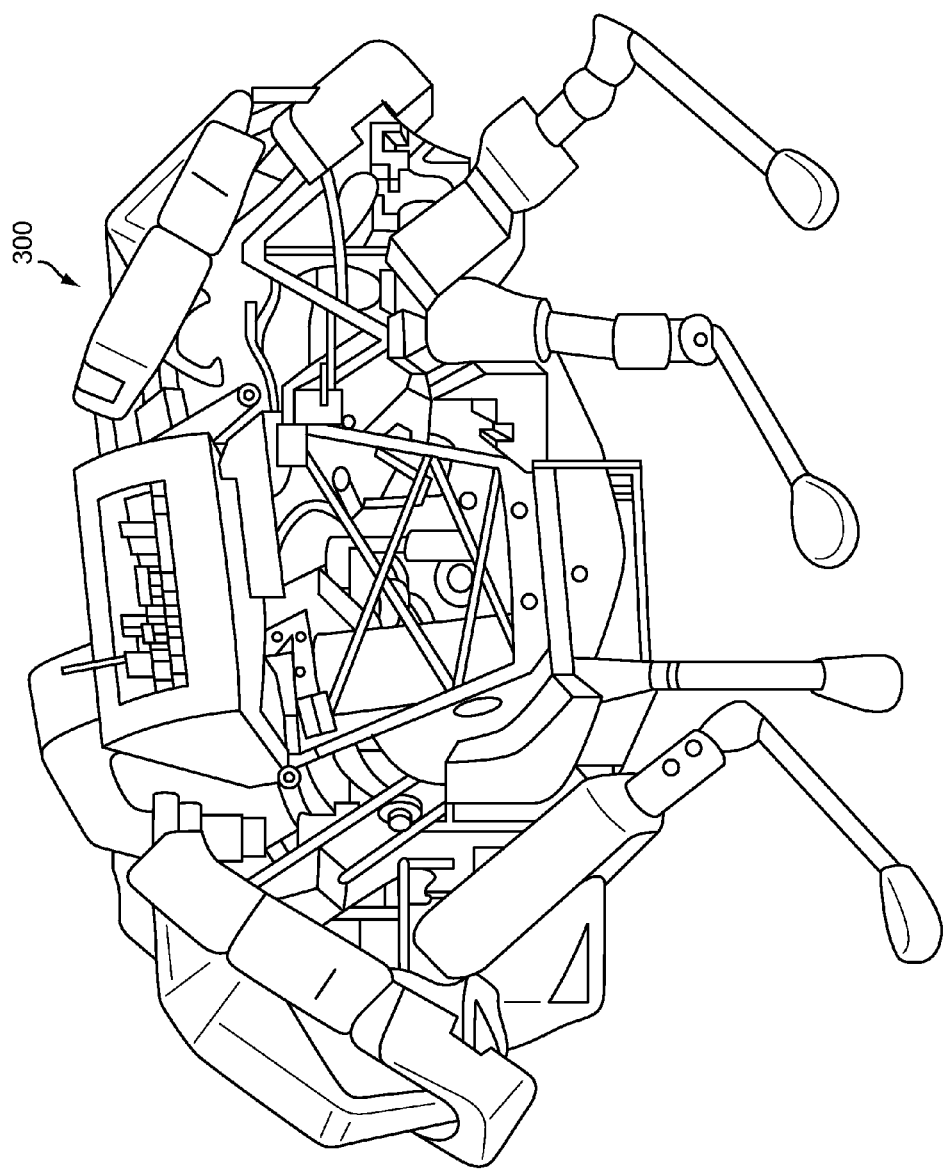
FIG. 3 illustrates another quadruped robot, according to an example implementation.

FIG. 3 illustrates another example quadruped robot, according to an example implementation. Similar to robot 200 shown in FIG. 2, the robot 300 may correspond to the robotic system 100 shown in FIG. 1. The robot 300 serves as another possible example of a robot that may be configured to avoid slips of the robot's feet, detect slips that occur, and handle and/or respond to slips and other disturbances to a gait of the robot. Other examples of robots may exist.

Figure 4:
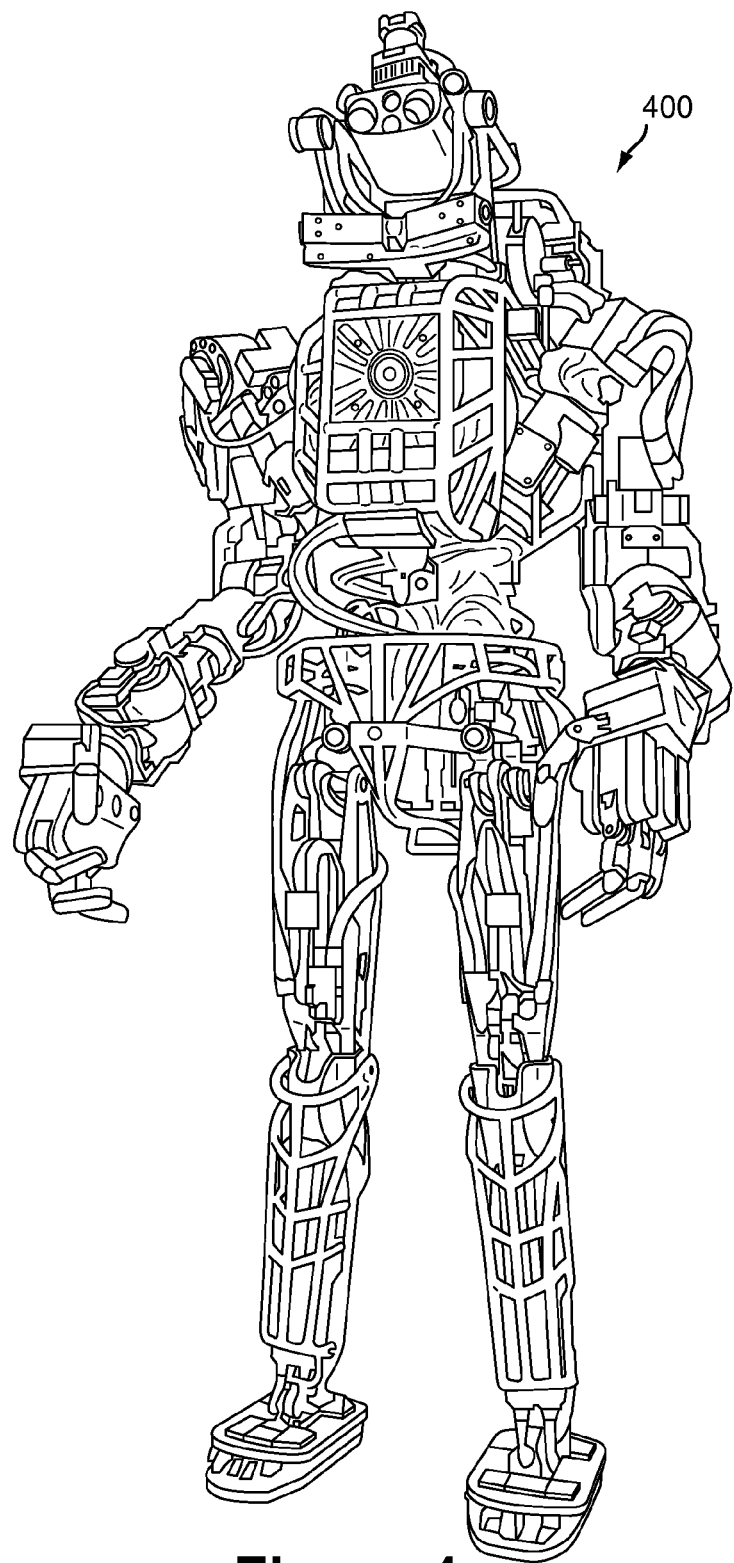
FIG. 4 illustrates a biped robot, according to an example implementation.

FIG. 4 illustrates an example of a biped robot according to another example implementation. Similar to robots 200 and 300 shown in FIGS. 2 and 3, the robot 400 may correspond to the robotic system 100 shown in FIG. 1. The robot 400 serves as another possible example of a robot that may be configured to avoid slips of the robot's feet, detect slips that occur, and handle and/or respond to slips and other disturbances to a gait of the robot. Other examples of robots may exist.

III. EXAMPLE IMPLEMENTATIONS FOR CONTROLLING A LEGGED ROBOT

Example implementations are discussed below for controlling an example legged robot. The control of the legged robot may include avoiding slips of the robot's foot when the foot is in contact with the ground surface. The control may further include detecting slips of the robot's foot when a slip occurs. Still further implementations are discussed for handling and/or responding to slips and other disturbances that may affect the gait of the robot, particularly when the robot encounters varying types of ground surfaces and terrain.

Further, the term ground surface as used herein is meant to encompass any possible surfaces and terrain that the robot may encounter, and is not meant to be limiting. For instance, the ground surface may be indoors or outdoors, may be rigid or loose, such as sand or gravel, and may include discontinuities or irregularities such as stairs, rocks, fallen trees, debris, and the like. Numerous other examples exist.

Flow charts 500, 700, 900, 1100, 1300, and 1500 shown in FIGS. 5, 7, 9, 11, 13, and 15 respectively, present example operations that may be implemented by a robot, such as the example robot 200 shown in FIG. 2 or the example robot 400 shown in FIG. 4. Flow charts 500, 700, 900, 1100, 1300, and 1500 may include one or more operations or actions as illustrated by one or more of blocks shown in each figure. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, the flow charts 500, 700, 900, 1100, 1300, and 1500 and other operations disclosed herein provide the operation of possible implementations. In this regard, each block may represent a module, a segment, or a portion of program code, which includes one or more instructions executable by a processor for implementing specific logical operations. The program code may be stored on any type of computer readable medium, for example, such as a storage device including a disk or hard drive. In addition, each block may represent circuitry that is wired to perform the specific logical operations.

A. Example Implementations for Slip Avoidance

Figure 5:
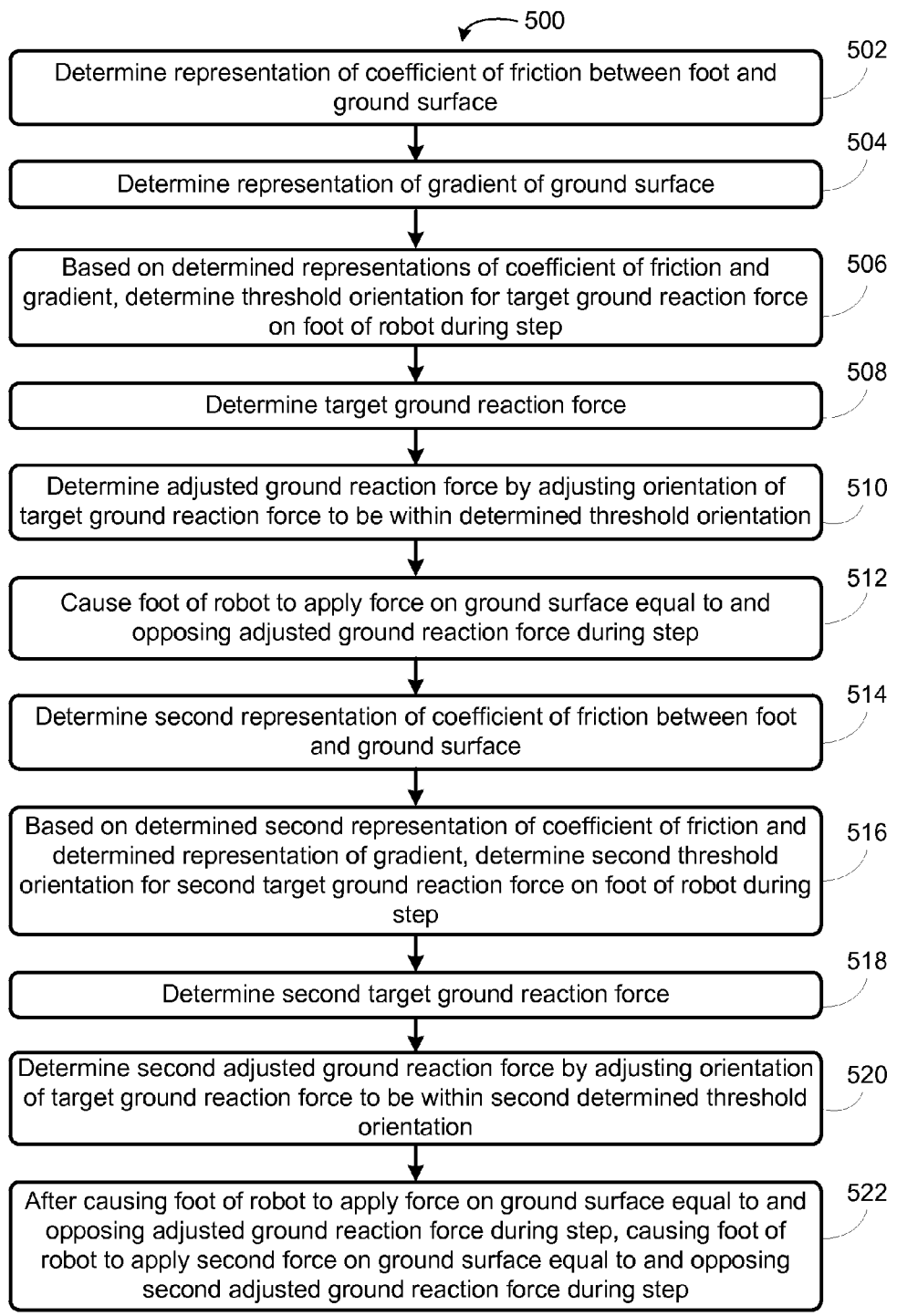
FIG. 5 is a flowchart according to an example implementation.

FIG. 5 is a flowchart 500 illustrating operations for avoiding slips of a robot's foot. The robot may be a biped robot with two feet, a quadruped robot with four feet, among other examples. Further, these operations may be performed by a robot that is walking, trotting, or running Other gaits are also possible.

Figure 6A:
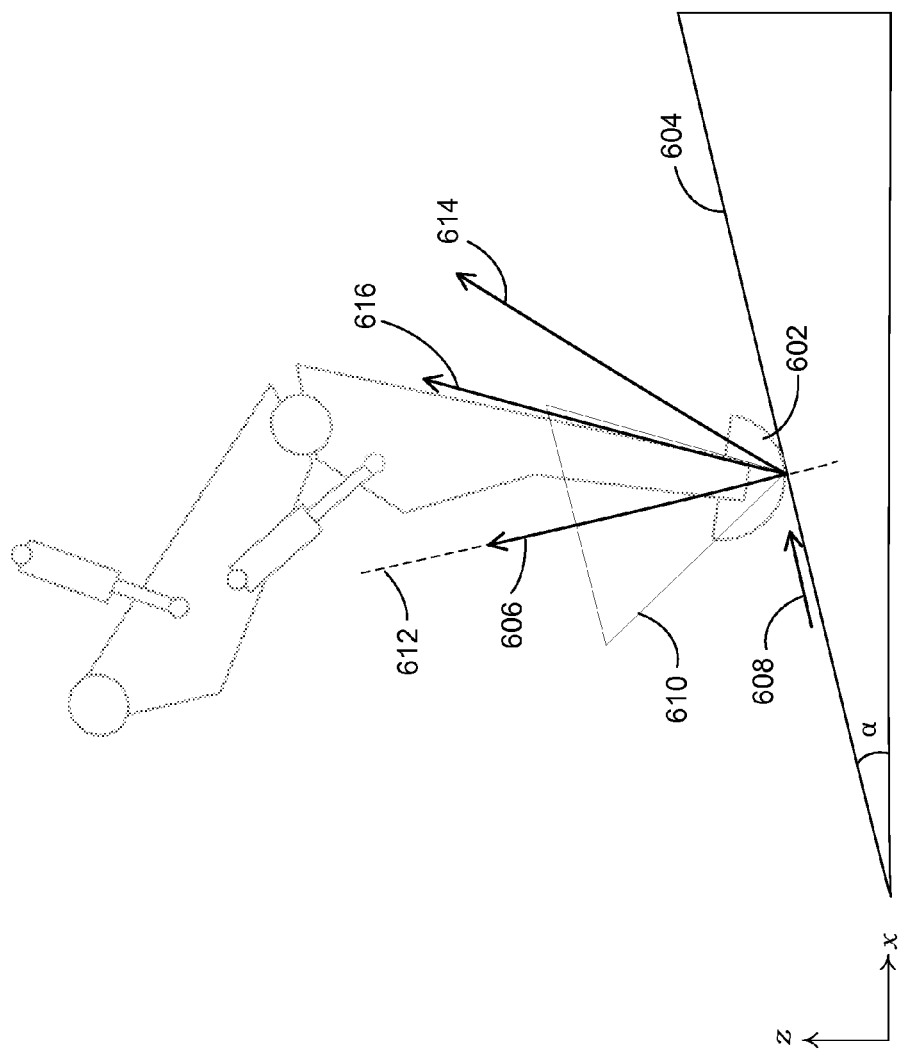
FIG. 6A illustrates a threshold orientation of a ground reaction force, according to an example implementation.

At block 502, a robot having at least one foot may determine a representation of a coefficient of friction ($\mu$) between the foot and a ground surface. FIG. 6A depicts an example foot 602 of a robot, such as the robot 200 shown in FIG. 2, in contact with a ground surface 604. In some cases, the determined representation of $\mu$ might not estimate the actual, or "true" value of the coefficient. Rather, the robot 200 may determine a representation of $\mu$ that is within a probable range and then adjust the representation as necessary as the robot 200 walks on the ground surface. For instance, the robot 200 may initially determine a representation of $\mu$ within a range of 0.4 to 0.6, representing a coefficient of friction between the robot's foot 602 and many commonly encountered types of ground surfaces. The robot 200 may then adjust that initial value either upward or downward based on any number of factors. For example, the robot 200 may increase or decrease the representation of $\mu$ based on the frequency that slips are detected of the robot's foot 602. Other examples are also possible.

At block 504, the robot 200 may determine a representation of a gradient of the ground surface. The determined representation of the gradient may be expressed as an angle, a, as shown in FIG. 6A. In some cases, the gradient of the ground surface may approximated by a plane, which may include an angle of inclination in both the forward and lateral directions of the robot 200. The robot 200 may base its determination of the gradient on data received from sensors of the robot 200. For example, the detected ground reaction forces on one or more feet 602 of the robot 200 may indicate that the ground surface 604 is not perpendicular to the gravity vector. Further, one or more IMUs of the robot 200 may determine that the height of the robot's body (i.e., the height of the IMU) has changed relative to the z-axis, indicating that the robot 200 may be moving along an inclined surface. Additionally or alternatively, the robot 200 may base the representation of the gradient on data received from a LIDAR, stereoscopic vision, or other spatial recognition system. Other examples are also possible.

At block 506, based on the determined representations of the coefficient of friction and the slope, the robot 200 may determine a threshold orientation for a target ground reaction force on the foot 602 of the robot 200 during a step. A given ground reaction force may include both a normal force component 606, $F_n$, perpendicular to the ground surface 604, and a friction force component 608, $F_f$, parallel to the ground surface 604. The friction force is limited by the coefficient of friction, $\mu$, according to the equation:

$$F_f \leq \mu F_n$$

Accordingly, the threshold orientation may indicate an angle of incidence for the given ground reaction force at which the friction force 608 reaches its maximum value with respect to the normal force 606, based on the determined $\mu$. This may be referred to as the friction angle. In other words, a ground reaction force outside of the threshold orientation (i.e., exceeding the friction angle in any direction) would require a greater friction force component than is possible, and may result in a slip of the foot 602.

As shown in FIG. 6A, the threshold orientation 610 may be geometrically approximated by a cone, or "friction cone." The friction cone includes a center axis 612, and is oriented such that the center axis 612 is perpendicular to the ground surface 604 and aligned with the normal force 606. The radius of the friction cone is based on the angle of friction defining the cone, which is based on the determined value of $\mu$.

At block 508, the robot 200 may determine the target ground reaction force, where the target ground reaction force includes a magnitude and an orientation. A target ground reaction force may be determined based on numerous factors. For example, the robot 200 may determine the target ground reaction force based on the force that may be required to maintain the current gait of the robot. The determination may additionally be based on the sensor data regarding the robot's position and velocity, indications that the robot may receive regarding disturbances to the robot's gait, among other possibilities.

Accordingly, the robot 200 may determine a target ground reaction force that, when it acts upon the robot 200, may support the robot's weight, move the robot in a given direction, maintain the robot's balance, and/or correct a velocity or position error that has been detected, among other examples.

Further, the target ground reaction force may be determined and updated continuously throughout a given step of the robot 200, and may vary depending on the sensor data received by the robot 200. As shown in FIG. 6A, the target ground reaction force 614 may be represented by vector that includes both a magnitude and an orientation. In this example, the target ground reaction force 614 lies outside the threshold orientation 610 represented by the friction cone, and may result in a slip of the robot's foot 602.

In some examples, it may be desirable to limit the orientation of the target ground reaction force in a given direction more than others. For example, in some cases, errors to a robot's forward-moving gait that occur in the lateral (y-axis) direction may be more difficult for the robot to correct than errors in the forward (x-axis) direction. Thus, similarly, a roll error (rotation about the x-axis) may be more difficult for some robots to correct than a pitch error (rotation about the y-axis). Consequently, the robot may determine a more limited threshold orientation in the lateral direction, in order to move conservatively avoid lateral slips that may lead to lateral velocity errors or roll errors.

Therefore, in some implementations, the determined $\mu$ may represent the coefficient of friction in the forward direction, $\mu_x$, and the robot may determine a smaller representation, $\mu_y$, in the lateral direction. For instance, the robot may determine $\mu_y$ to be a fraction of $\mu_x$, such as one half of $\mu_x$. Other fractions, and other examples of how the robot may determine $\mu_y$ are also possible.

The resulting threshold orientation may be geometrically approximated by a stretched cone in which a cross-section of the stretched cone may be represented by an ellipse, rather than a circle. FIG. 6B illustrates a top view of an example of a first threshold orientation 610a, determined based on the same value of $\mu$ in both the x and y directions, as well as a top view of a second threshold orientation 610b, determined based different values determined for $\mu_x$ and $\mu_y$.

At block 510, the robot may determine an adjusted ground reaction force by adjusting the orientation of the target ground reaction force to be within the determined threshold orientation 610. For example, adjusting the orientation of the target ground reaction force 614 may include reducing the friction force component and increasing the normal force component of the target ground reaction force 614. As a result, as shown in FIG. 6A, the adjusted ground reaction force 616 is within the threshold orientation 610. Accordingly, the adjusted ground reaction force 616 includes a friction component 608 that is less than the maximum friction force, and thus may avoid a slip of the robot's foot 602. In some cases where the target ground reaction force 614 is updated continuously throughout a given step, the robot may determine an adjusted ground reaction force 616 for each update to the target ground reaction force 614.

In some cases, the target ground reaction force 614 might not be outside the threshold orientation 610 for a given step of the robot, and thus the robot 200 may determine an adjusted ground reaction force 616 that is equal to the target ground reaction force 614. Alternatively, in some implementations the robot 200 may include programming for comparing the orientation of the target ground reaction force 614 to the threshold orientation 610 and determining if the target ground reaction force 614 lies outside of the threshold. If the robot 200 determines that it does not, it might not perform the step of determining an adjusted ground reaction force 616.

At block 512, the robot 200 may cause the foot 602 of the robot 200 to apply a force to the ground surface 604 approximately equal to and opposing the adjusted ground reaction force 616 during the step. This may result in the adjusted ground reaction force 616 being applied to the robot 200 by the ground surface 604, as desired. For example, the robot 200 may determine the adjusted ground reaction force 616 while the foot 602 is in a swinging state, before it contacts the ground. The robot 200 may then cause the foot 602 to make contact with the ground at the force approximately equal to and opposing the adjusted ground reaction force. In some examples, the robot 200 may maintain the orientation of the applied force for the duration of the step, until the foot lifts off of the ground surface 604 again.

Alternatively, the robot may determine a second threshold orientation and a second adjusted ground reaction force during a given step. For example, it may be desirable to determine a more conservative, first representation of $\mu$, in the early stages of a given step, which may be expressed as $\mu_1$. For instance, after the foot 602 of the robot 200 initially makes contact with the ground surface 604, the ground surface 604 may compress and/or conform to the foot 602. This may increase the traction, i.e., the coefficient of friction and the available friction force, between the foot 602 and the ground surface 604. Accordingly, at block 514, the robot 200 may determine a second representation of the coefficient of friction, $\mu_2$, between the foot 602 and the ground surface 604, wherein the second representation $\mu_2$ is greater than the first representation $\mu_1$.

Figure 6C:
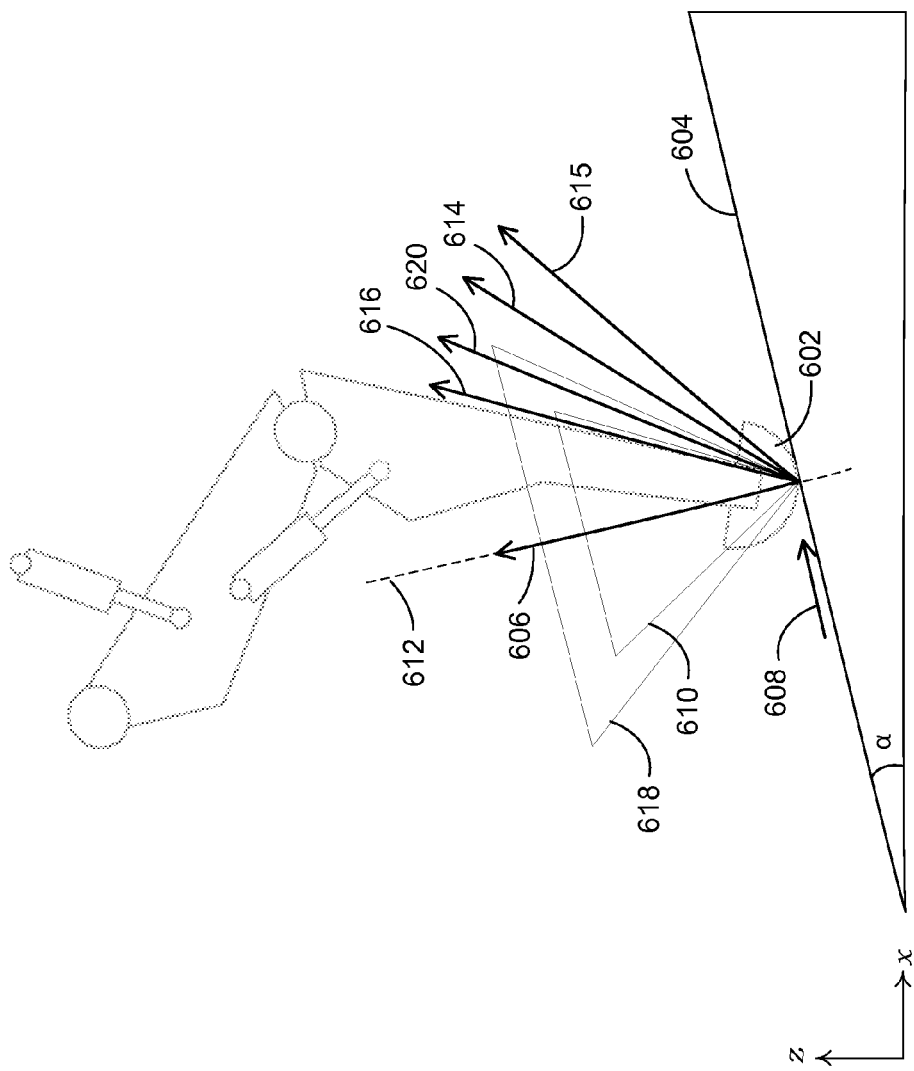
FIG. 6C illustrates another threshold orientation of a ground reaction force, according to an example implementation.

At block 516, the robot 200 may, based on the determined $\mu_2$ and the determined representation of the gradient, determine a second threshold orientation for the target ground reaction force on the foot 602 during the step. Because $\mu_2$ is greater than $\mu_1$, the second threshold orientation may be larger than the first. For instance, FIG. 6C shows the example friction cone representing the first threshold orientation 610, as well as a larger cone representing the second threshold orientation 618.

The robot 200 may increase the representation from $\mu_1$ to $\mu_2$, and thus the size of the friction cone, at any point during a given step, and may do so continuously and smoothly throughout the step. In some cases, the robot 200 may determine the second threshold orientation after a determined time period during the step. For instance, the step may have an estimated duration, such as one second. The robot 200 may determine the estimated duration of the step based on one or more of a default value, the gait of the robot, data received from sensors, among other examples. The robot 200 may then determine the time period to be approximately one half of the estimated duration (i.e., one half of a second). Thus, the size of friction cone may begin at the first threshold orientation, and then increase gradually until it fully expands to the second threshold orientation half-way through the step. Other time periods, such as, for instance, the entire duration of the step, as well as other methods for determining a second threshold orientation for the second target ground reaction force on the foot of the robot during the step, are also possible.

At block 518, the robot 200 may determine a second target ground reaction force having a magnitude and an orientation. The second target ground reaction force may be determined based on any of the factors noted above with respect to block 508, among other factors. As shown in FIG. 6C, the second target ground reaction force 615 may be represented by vector that includes both a magnitude and an orientation. In this example, the second target ground reaction force 615 lies outside the second threshold orientation 618 represented by the friction cone, and may result in a slip of the robot's foot 602.

At block 520, the robot 200 may determine a second adjusted ground reaction force by adjusting the orientation of the second target ground reaction force 615 to be within the determined second threshold orientation 618. FIG. 6C shows the second adjusted ground reaction force 620, which includes a larger friction component than the first adjusted ground reaction force 616. Because the threshold orientation may be continuously updated from the first to the second orientations, and the target ground reaction force may be continuously updated between the first and second forces, the robot 200 may also continuously determine the adjusted ground reaction forces.

In some cases, the second target ground reaction force 615 might not be outside the second threshold orientation 618 for a given step of the robot 200, and thus the robot 200 may determine a second adjusted ground reaction force 620 that is the target ground reaction force 615.

At block 522, after causing the foot 602 to apply the first force on the ground surface 604 approximately equal to and opposing the first adjusted ground reaction force 616 during the step, the robot 200 may cause the foot 602 to apply a second force on the ground surface 604 approximately equal to and opposing the second adjusted ground reaction force 620 during the step. For example, the robot 200 may adjust the orientation of the first applied force during the step, in order apply the second force approximately equal to and opposing the second adjusted ground reaction force. Further, just as the robot 200 may continuously update the adjusted ground reaction force during the step as noted above, the robot 200 may continuously update the force that it causes the foot to apply to the ground surface.

In some examples, the robot 200 may detect an indication of an increase in the gradient of the ground surface 604 and, based on the indication, determine the second coefficient of friction $\mu_2$ as discussed above. An inclined ground surface, such as the ground surface 604 shown in FIGS. 6A, 6C and 6D may require ground reaction force with a larger friction component in order for the robot 200 to ascend the incline.

In another example, the robot 200 may encounter an incline and adjust the geometry of the threshold orientation 610 during the step, rather than determining a second threshold based on a new representation of $\mu$. For instance, based on a detected indication of an increase in the gradient of the ground surface 604, the robot may determine an adjusted threshold orientation such that the center axis 612 of the cone approximating the threshold orientation 610 approaches the gravity vector. The robot 200 may then determine a second adjusted ground reaction force 628 by adjusting the orientation of the second target ground reaction force 615 to be within the adjusted threshold orientation.

Figure 6D:
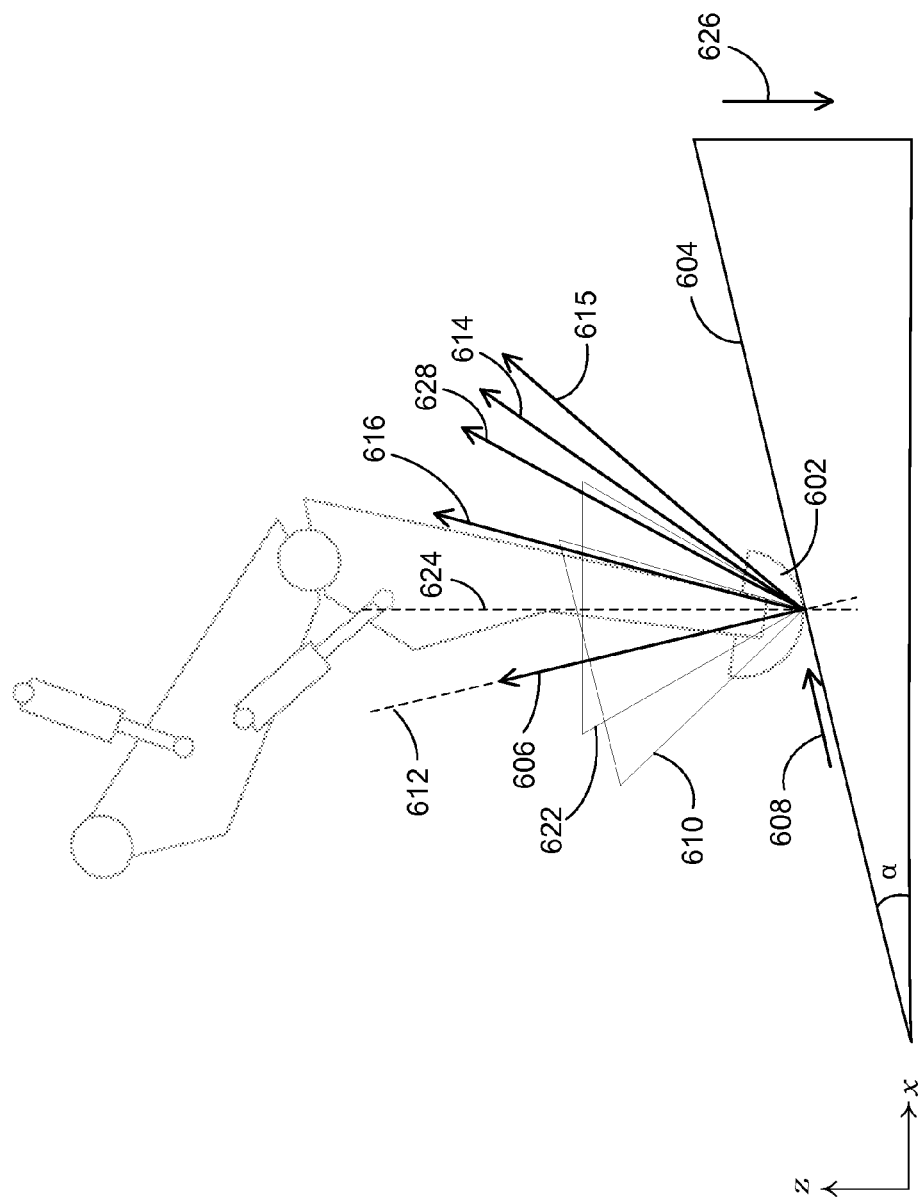
FIG. 6D illustrates another threshold orientation of a ground reaction force, according to an example implementation.

As shown in FIG. 6D, the unadjusted threshold orientation 610 is shown, as above, along with the target ground reaction force 614 and the first adjusted ground reaction force 616 within the friction cone. The adjusted threshold orientation 622 is also shown, which is determined by rotating the friction cone about its tip such that the adjusted center axis 624 approaches the gravity vector 626. The determined second adjusted ground reaction force 628 is shown within the limits of the adjusted threshold orientation 622. Accordingly, after causing the foot 602 to apply the first force on the ground surface 604 approximately equal to and opposing the first adjusted ground reaction force 616 during the step, the robot 200 may cause the foot 602 to apply a second force on the ground surface 604 approximately equal to and opposing the second adjusted ground reaction force 628 during the step.

In yet another example, the robot 200 may adjust the friction cone during a step based on an indication that a second foot of the robot 602 has slipped. For instance, in some cases it may be desirable to shrink the friction cone in the initial stages of a step after a slip has been detected. This may help to prevent consecutive slips and a potentially escalating number of velocity and/or rotational errors in the robot's gait.

Thus, after determining $\mu_1$, the threshold orientation 610, and the first adjusted ground reaction force 616, the robot 200 may detect an indication of a slip of a second foot of the robot. Based on the detected indication, the robot may determine a second friction coefficient, $\mu_2$, that is less than the first representation, $\mu 1$. For example, the robot 200 may reduce the coefficient of friction to one-sixth of its original value. Other examples are also possible.

The robot 200 may further determine a second, smaller threshold orientation and a second adjusted ground reaction force as noted above. Then, before causing the foot 602 to apply the first force on the ground surface 604 approximately equal to and opposing the first adjusted ground reaction force 616, the robot 200 may cause the foot 602 to apply a second force on the ground surface 604 approximately equal to and opposing the second ground reaction force. By causing the foot 602 to apply the second force on the ground surface 604 in the initial stages of the step, the robot 200 may decrease the likelihood of a slip of foot 602.

B. Example Implementations for Slip Detection

1. First Example Implementation for Slip Detection

Figure 7:
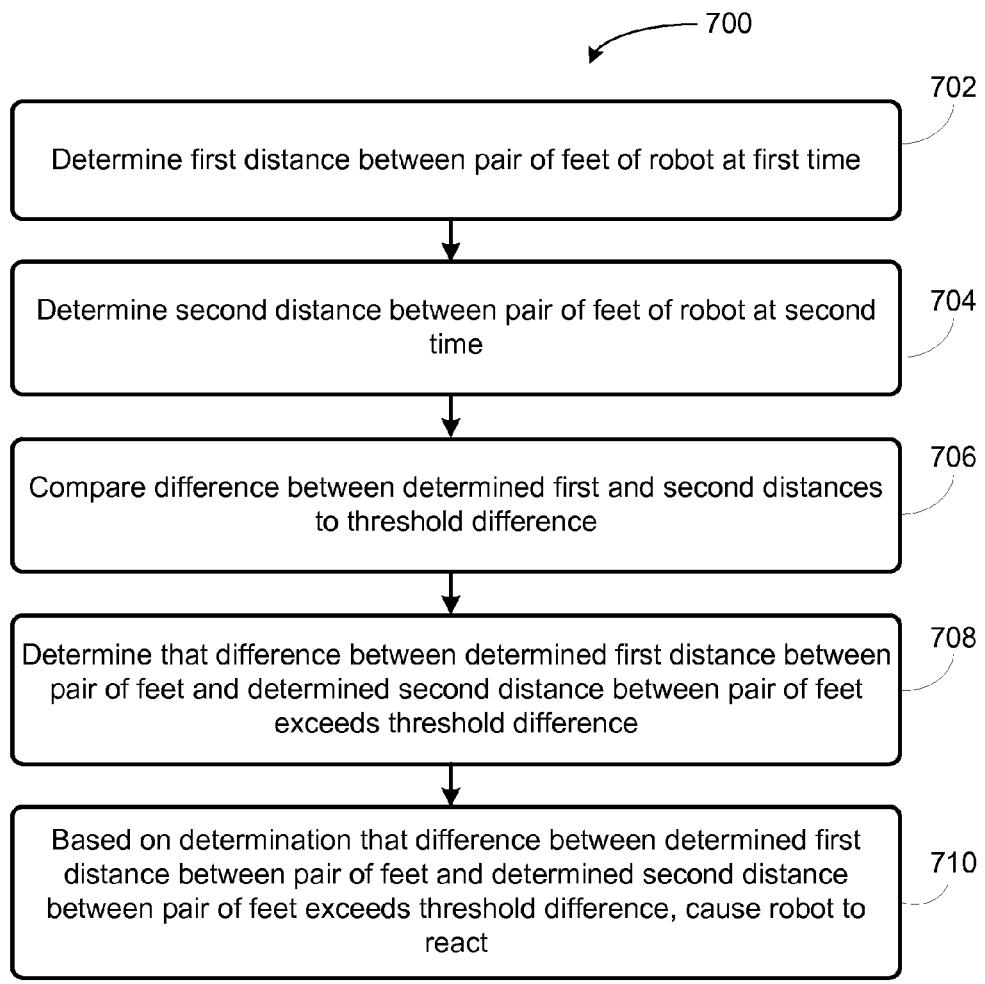
FIG. 7 is a flowchart according to an example implementation.

FIG. 7 is a flowchart 700 illustrating operations for detecting slips of a robot's foot. The operations of flowchart 700 may be utilized by a robot that has two feet in contact with the ground, or in "stance," for a given time period, such as the duration of a step.

At block 702, a robot comprising a set of sensors may determine, based on first data received from the set of sensors, a first distance between a pair of feet of the robot that are in contact with a ground surface at a first time. The robot may be, for example, a quadruped robot such as the robot 200 shown in FIG. 2.

Figure 8A:
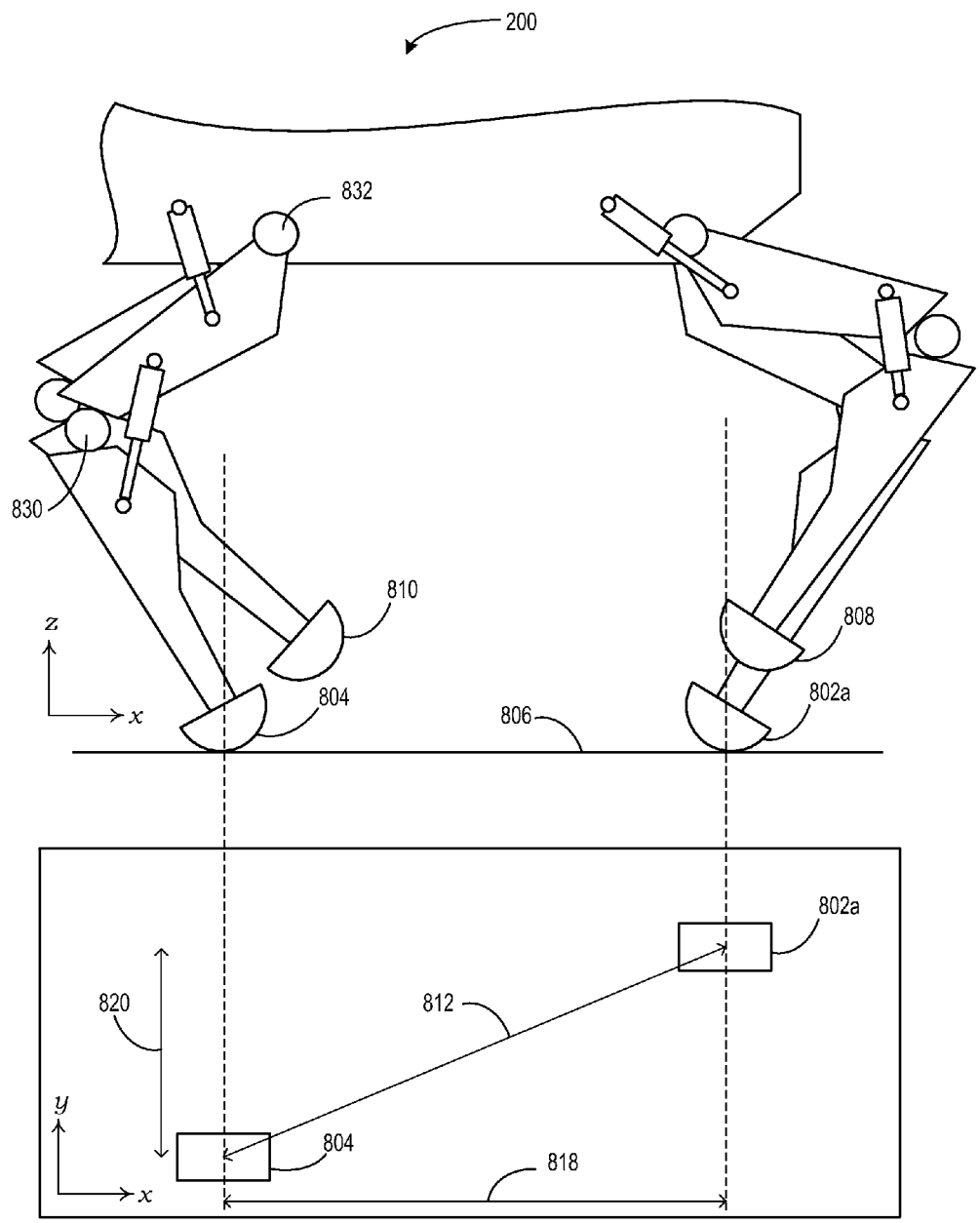
FIG. 8A illustrates a pair of feet of a robot in contact with a ground surface, according to an example implementation.

The pair of feet between which the first distance is measured may include the opposite feet on either side of the robot 200—such as the left front and the right rear foot. For some gaits of the robot 200, such as a trotting gait, these feet may contact the ground surface for approximately the same time period during a given step. FIG. 8A illustrates an example of the robot 200 in a trotting gait at time 1, with its left front foot 802*a* and right rear foot 804 in contact with the ground surface 806. The other feet of the robot 200, i.e., the right front foot 808 and the left rear foot 810, are in a "swing" state, and are not in contact with the ground surface 806. Other configurations of the robot's feet are possible as well.

The set of sensors may include position sensors in the legs of the robot 200. The sensors may detect and relay position and velocity data to a control system, and possibly other systems, of the robot 200. The set of sensors may include one or more sensors 830 located in the knee joints of the legs that detect the movements on the knee joint. The set of sensors may also include one or more sensors 832 located in the hip joints of the legs that detect movements of the hip joint. Other sensors may be included in the set of sensors, and the location of these sensors on the robot 200 may be varied.

The first distance 812 between the pair of feet in contact with the ground surface 806 may be determined based on data received from the sensors of the robot 200. FIG. 8A shows, below the illustration of the robot 200, a top view of the robot's pair of feet in contact with the ground surface 806. The line between the pair of feet represents the first distance 812 between the pair of feet at time 1.

In some examples, the pair of feet may be in a swing state before contacting the ground surface 806. After the robot causes both feet in the pair of feet to make contact with the ground surface 806, the ground surface 806 may compress and/or conform to the left front foot 802a and/or right rear foot 804. Therefore, time 1 might not correspond to the instant that the pair of feet makes ground contact, when small shifting may occur and a foothold is established. Instead, the distance 812 may be detected a brief period of time after contact. For example, time 1 may be within a range of 10-50 milliseconds after the pair of feet makes contact with the ground surface 806.

Figure 8B:
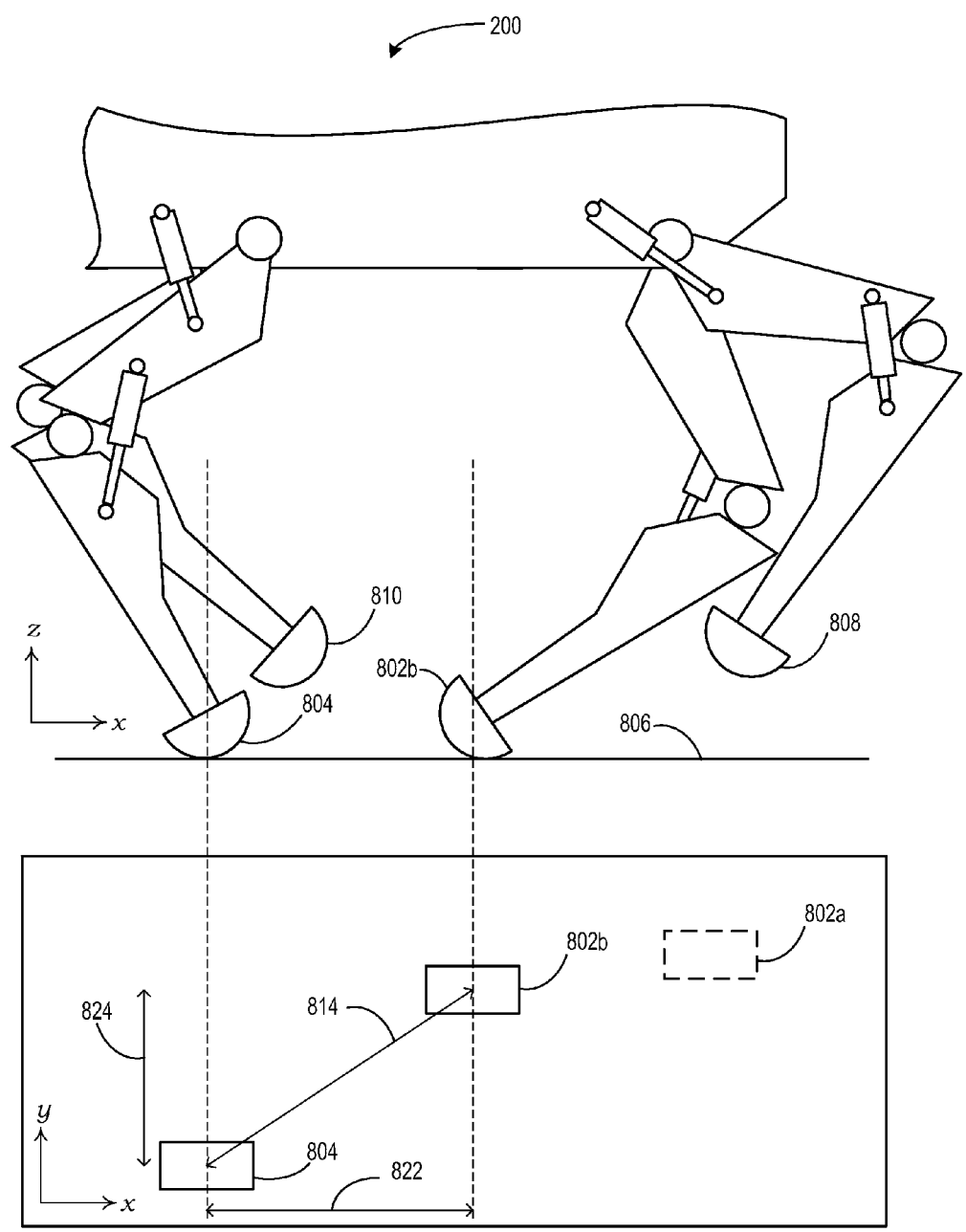
FIG. 8B illustrates the pair of feet of the robot in contact with the ground surface, according to an example implementation.

At block 704, the robot 200 may determine, based on second data received from the set of sensors, a second distance between the pair of feet at a second time, where the pair of feet remains in contact with the ground surface from the first time to the second time. FIG. 8B shows the robot 200 at time 2, which may be a later time during the step shown in FIG. 8A. The right front foot 808 and left rear foot 810 have swung forward during the step, while the left front foot 802b and right rear foot 804 (i.e., the pair of feet) remain in contact with the ground surface 806. However, as shown in the top view of FIG. 8B, the left front foot 802b has shifted along the x-axis, toward the rear of the robot 200. Thus, the second distance 814 between the pair of feet may be determined to be shorter than the first distance 812.

At block 706, the robot 200 may compare a difference between the determined first and second distances to a threshold difference. For example, the threshold difference may indicate the distance below which a slip of the robot's foot may be too small to cause a significant error to the robot's gait. Further, in some cases, the robot's potential reaction to a determined slip may further disrupt the gait of the robot 200, and therefore it may be desirable to tolerate small slips of the robot's feet and correct them in subsequent steps, rather than initiate an immediate reaction.

The threshold difference may be represented by a variable $\epsilon$, and may be a predetermined or default value. Further, the threshold difference $\epsilon$ may be different between different robot configurations (e.g., the size of the robot). In some cases, the threshold difference may be between 1 and 50 centimeters. Other threshold differences are also possible. Further, the robot 200 may adjust $\epsilon$ at various times based on the gait of the robot 200, the ground surface conditions detected by the robot 200, or slips or other disturbances detected by the robot 200, among other factors.

Figure 8C:
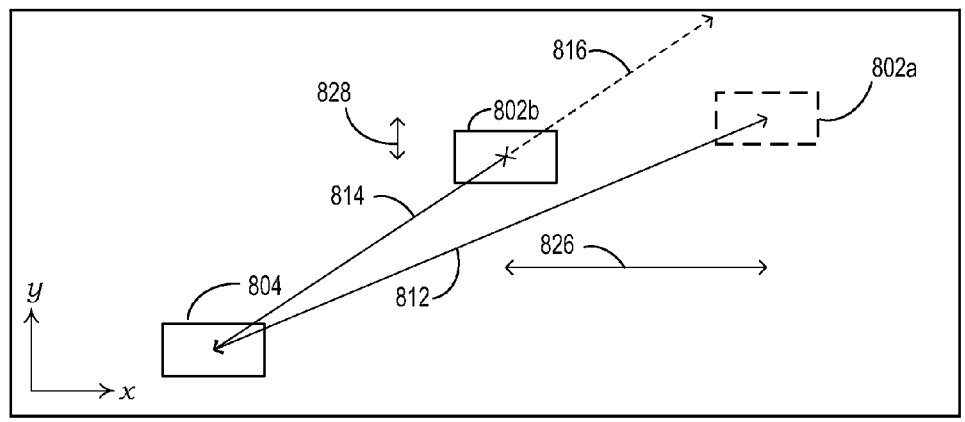
FIG. 8C illustrates the pair of feet of the robot in contact with the ground surface, according to an example implementation.

FIG. 8C shows a top view of the pair of feet of the robot 200 at both time 1 and time 2. The distances 812, 814 between the feet at time 1 and time 2 are also shown, as well as the difference 816 between the two distances 812, 814. The robot 200 may then compare the difference 816 to the threshold difference $\epsilon$.

In some cases, determining the first and second distances based on a single, scalar distance between the pair of feet may be sufficient to detect the majority of, or possibly all, slips that may occur. For example, the movement of the robot's feet may be constrained in one or more directions, such as the lateral direction (y-axis), based on the configuration of the robot or the robot's surroundings. Further, the ground surface may be a relatively flat, solid surface such that there is little or no chance that the robot's foot may slip in the vertical direction (z-axis). Thus, slips may be limited to a single direction (x-axis), and a single measurement of the distance between the feet will recognize any relative movement of the feet. Other examples where a single measurement of the distance between the pair of feet may be sufficient are also possible.

However, if movement of a given foot is possible in more than one coordinate direction, determining a single distance between the pair of feet might not recognize some potential slips. For example, the left front foot 802a may slip in both the forward and lateral directions (along the x- and y-axes), such that the resulting position of the left front foot 802b rotates on an arc having the right rear foot 804 at its center. Consequently, the distance between the pair of feet may remain the same, despite the slip of one of the pair of feet.

Therefore, in some examples, the robot 200 may at block 702 determine a first x-distance, a first y-distance, and a first z-distance between the pair of feet along three respective axes of a three-axis coordinate system at the first time. For example, returning to FIG. 8A, the top view of the robot's feet shows the x-distance 818 and the y-distance 820 between the left front foot 802a and the right rear foot 804. Because the ground surface 806 in FIG. 8A is flat, the pair of feet may be at the same relative position with respect to the z-axis and there may be no z-distance between the pair of feet at time 1.

The robot 200 may further determine at block 704 a second x-distance, a second y-distance, and a second z-distance between the pair of feet along the three respective axes of the three-axis coordinate system at the second time. The top view in FIG. 8B shows the x-distance 822 and the y-distance 824 between the left front foot 802b and the right rear foot 804. Again, because the ground surface 806 in FIG. 8B is flat, there may be no z-distance between the pair of feet at time 2.

After determining the distances between the pair of feet in the coordinate directions, the robot 200 may at block 706 compare the differences between each set of distances to a threshold difference specific to that coordinate direction. Thus, the robot 200 may compare an x-difference between the first x-distance and the second x-distance to an x-threshold difference, $\epsilon_x$, and so on for the y- and z-directions.

FIG. 8C shows the top view of the pair of feet at both time 1 and time 2. The x-difference 826 is shown as well as the y-difference 828. Because no distance was detected between the pair of feet in the z-direction at either time 1 or time 2, there may be no z-difference. Further, the distances 812 and 814 shown in FIG. 8C may represent scalar quantities, unassociated with any particular direction at time 1 and time 2. In some cases, the robot may compare the difference 816 between the scalar distances to a scalar threshold difference, $\epsilon_{mag}$, in addition to the comparisons in the three coordinate directions.

In some cases, the threshold difference $\epsilon$ may be not be equal for the different coordinate directions and for the scalar distance. For instance, some robots and/or gaits may be relatively more sensitive to slips in the lateral direction, making it desirable to detect and account for smaller slips that might otherwise be ignored if the slip was in, for instance, the forward direction. Therefore, the threshold $\epsilon_y$ may be smaller than $\epsilon_x$. Other examples are also possible.

In some examples, the robot 200 may monitor the distance(s) between the pair of feet continuously throughout a given step. For example, the robot 200 may repeat the operations of i) determining the second distance between the pair of feet and ii) comparing the difference between the determined first and second distances to the threshold difference. The robot 200 may repeat these operations at a frequency, such as a frequency within the range of 1-1000 Hz, until the robot detects an indication to stop repeating the operations. Other frequencies are also possible, and may vary for different robot configurations.

For instance, the robot 200 may determine an updated second distance between the pair of feet every five milliseconds, and may compare the difference between each updated second distance and the first distance to the threshold difference. When the robot's foot 802a first begins to slip in the example shown in FIGS. 8A-8B, the difference in position might not be great enough to exceed the threshold difference. Every five milliseconds, as the foot 802a continues to slip, the robot 200 may again compare the updated difference with the threshold difference. In some examples, the robot 200 may increase or decrease the frequency at which the differences are updated and compared during a step, perhaps in response to a detected slip or other disturbance.

The robot 200 may continue repeating the operations of determining the second distance and comparing the difference between the second and first distances to the threshold difference until the robot 200 detects an indication to stop repeating the operations. For example, the robot may stop repeating the operations when it detects an indication that the pair of feet is no longer in contact with the ground surface. This may indicate that the pair of feet has lifted off of the ground to enter a swinging state. Further, the robot 200 may stop repeating the operations if detects an indication of a slip of the robot's feet that exceeds the threshold. Other examples are also possible.

At block 708, the robot 200 may determine that the difference between the first distance between the pair of feet and the second distance between the pair of feet exceeds the threshold difference. The determination may be based on the comparison of the differences in all three coordinate directions, and may further be based on at least one of the three differences exceeding the respective threshold. The robot may additionally or alternatively determine that the difference between the scalar distances exceeds the scalar threshold difference.

At block 710, based on the determination that the difference exceeds the threshold difference, the robot 200 may cause itself to react. The robot 200 may take one or more actions based on the determination that a threshold difference between the pair of feet has been exceeded. For example, the robot 200 may generate an indication of slip. The indication may be sent to systems within the robot 200 that may further respond to the slip or log the indication, among other examples.

Further, the robot may include a third foot that is not in contact with the ground surface, and may cause the third foot to make contact with the ground surface based on the threshold being exceeded. For example, a slip may occur relatively early in a step, shortly after the pair of feet of the robot are in stance. In such an example, a positional or rotational error in the robot's gait that was introduced by the slip may continue to accelerate until the swinging leg(s) complete their swing trajectory and make ground contact. However, in some situations, depending on the severity of the slip, the error may have grown too large for the new stance feet to arrest the error via ground reaction force control.

Therefore, it may be desirable for the third foot to end its swing early in order to more quickly make contact with the ground surface and reestablish ground reaction force control. For example, the robot 200 shown in FIGS. 8A-8B includes both a third foot 808 and a fourth foot 810. Based on the determination that the threshold was exceeded, the robot 200 may cause one or both of the feet 808, 810 to end their swing state and make early contact with the ground surface 806.

In some cases, the rapid step down of a foot that ends its swing early based on a detected slip may result in a relatively hard contact with the ground surface. This may lead to the detection of additional slips, particularly where the terrain is relatively loose, such as sand. This may result in another rapid step of the robot, and thus a cycle of slip detections and reactions. Thus, in some cases, the robot's reaction to the initial determination that the threshold has been exceeded (i.e., a slip) may additionally or alternatively include increasing the threshold.

For example, the robot 200 may incrementally increase the threshold difference such that a subsequent slip must be more severe than the initial slip, i.e., the difference between the detected distances between the pair of feet must be greater than the initial slip for the robot to react. This may include increasing one or more of $\epsilon_x$, $\epsilon_y$, $\epsilon_z$, or $\epsilon_{mag}$. The robot 200 may maintain the increased threshold difference for a predetermined period of time, or a predetermined number of steps of the robot, so long as no additional slips are detected. Other examples are also possible.

Further, the robot 200 may react to slips that occur in each coordinate direction in a different way. For a slip detected in a given direction, the reaction of the robot 200 may include any of the reactions noted above, or other possible reactions, alone or in combination.

Because the method 700 analyzes the relative distance between a pair of feet, detecting a slip according to method 700 might not indicate which foot in the pair is the source of the slip, or whether both feet slipped. In some cases, however, this information might not be necessary, depending on the particular robot, gait, or activity of the robot.

In other cases, it may be desirable to determine which foot in the pair of feet caused the detection of a slip. Further, the gaits of some robots might call for two feet of the robot to contact the ground together only briefly, or perhaps not at all, such as a biped robot in an example walking gait. Thus, some robots might alternatively or additionally determine slips by other methods.

2. Second Example Implementation for Slip Detection

Figure 9:
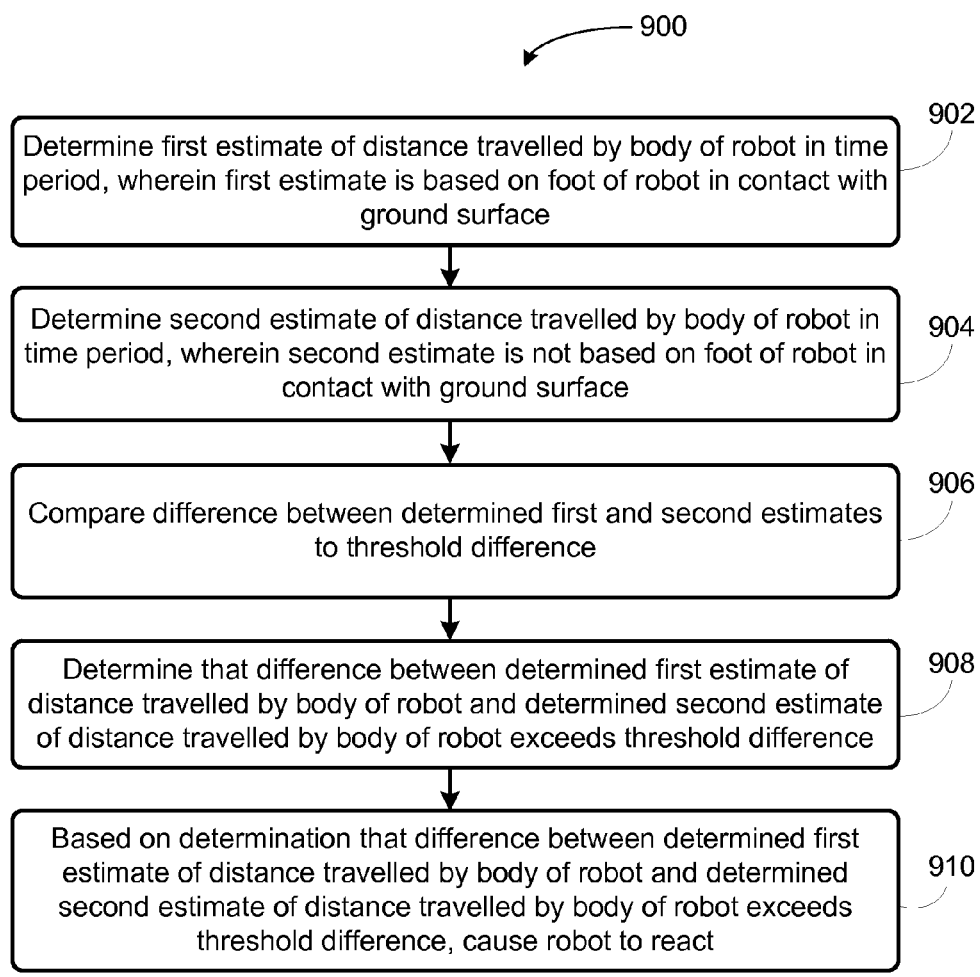
FIG. 9 is a flowchart according to an example implementation.

FIG. 9 is a flowchart 900 illustrating operations for detecting slips of a robot's foot. At block 902, a robot may determine, based on first data from a first set of sensors, a first estimate of a distance travelled by a body of the robot in a time period. The first estimate may be based on a foot of the robot that is in contact with a ground surface. For example, the robot may be a quadruped robot, such as the robot 200 or 300 shown in FIGS. 2 and 3. The robot may alternatively be a biped robot, such as the robot 400 shown in FIG. 4. Other examples also exist. In the paragraphs that follow, the flowchart 900 will be discussed with respect to the quadruped robot 200 shown in FIG. 2.

Figure 10A:
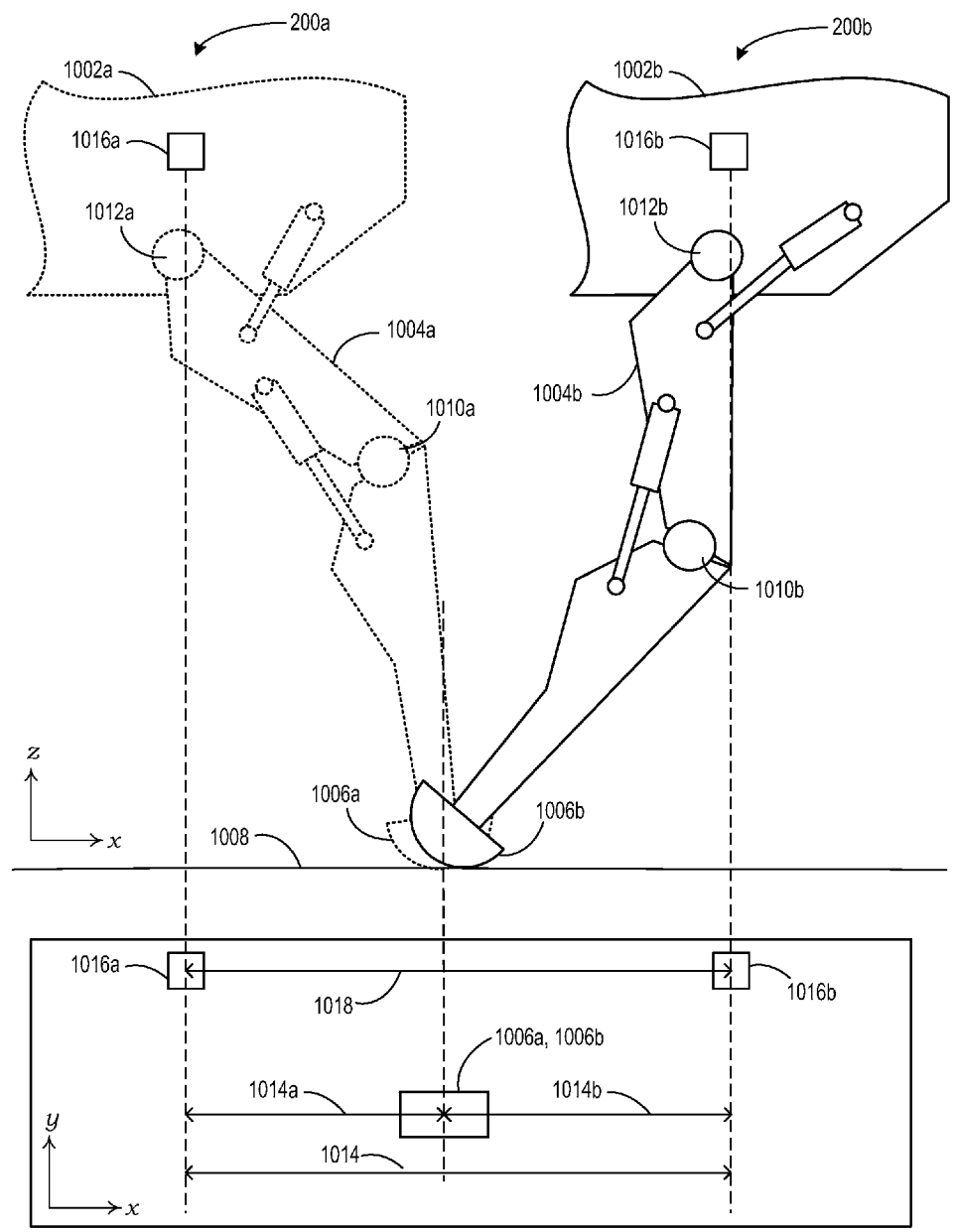
FIG. 10A illustrates a foot of a robot in contact with a ground surface, according to an example implementation.

FIG. 10A illustrates a side view and a top view of a body 1002a of the robot 200a coupled to a leg 1004a, including a foot 1006a, that is in contact with a ground surface 1008 at a first time. FIG. 10A also illustrates the body 1002b of the robot 200b coupled to the leg 1004b, including the foot 1006b, that is in contact with a ground surface 1008 at a second time, after the body 1006b has moved in the forward direction. Thus, FIG. 10A may illustrate a distance travelled by the body 1002a, 1002b of the robot 200a, 200b during a time period.

The first set of sensors may include position sensors in the leg 1004a, 1004b of the robot 200a, 200b. The sensors may detect and relay position and velocity data to a control system, and possibly other systems, of the robot 200a, 200b. The first set of sensors may include one or more sensors 1010a, 1010b located in a knee joint of the leg that detect the movements on the knee joint. The first set of sensors may also include one or more sensors 1012a, 1012b located in a hip joint of the leg that detect movements of the hip joint. Other sensors may be included in the first set of sensors, and the location of these sensors on the robot 200a 200b may be varied.

Based on the first data regarding the movement of the leg 1004a, 1004b received from the first set of sensors, the robot 200a, 200b may, through the application of forward kinematics equations, determine an estimated distance travelled by the body 1002a, 1002b with respect to the foot 1006a, 1006b of the robot 200a, 200b during the time period. This may be referred to as kinematic odometry.

For example, the robot 200a, 200b may determine, based on kinematic odometry, a first estimated distance 1014 travelled by a point in the body 1002a, 1002b with respect to the foot 1006a, 1006b. The point in the body 1002a, 1002b may be, for instance, the approximate geometric center of the robot's body 1002a, 1002b. Other reference points within the robot may be used, such as the location of an inertial measurement unit 1016a, 1016b as shown in FIG. 10A, among other examples.

As shown in FIG. 10A, the first estimated distance 1014 may be the sum of line segments 1014a and 1014b, which represent the respective distances travelled by the body 1002a, 1002b with respect to the foot 1006a, 1006b both before and after the body 1002a, 1002b passes over the foot 1006a, 1006b. The line segments 1014a and 1014b are shown for purposes of illustration, and might not be individually determined by the robot 200a, 200b.

If it is assumed that the foot 1006a, 1006b remains in contact with the ground surface 1008 during the time period, and does not slip or otherwise move relative to the ground 1008 during the time period, then the first estimated distance 1014 (i.e., the sum of 1014a and 1014b) travelled by the body 1002a, 1002b with respect to the foot 1006a, 1006b may be approximately equal to the distance travelled by the body 1002a, 1002b with respect to the ground surface 1008. Thus, utilizing the assumption of a nonmoving, or relatively non-moving stance foot 1006a, 1006b, the robot 200a, 200b may determine an estimated distance travelled by the body 1002a, 1002b of the robot 200a, 200b in the world frame.

At block 904, the robot 200 may determine, based on second data from a second set of sensors, a second estimate of the distance travelled by the body of the robot in the time period. The second estimate is not based on any foot of the robot that is in contact with the ground surface 1008.

For example, the second set of sensors may include one or more inertial measurement units (IMUs) that may detect the robot's velocity and acceleration in the world frame, where the vertical axis is aligned with the gravity vector. For instance, an IMU 1016a, 1016b may be located within the body 1002a, 1002b of the robot 200a, 200b, as shown in FIG. 10A. The IMU 1016a, 1016b may include a three-axis accelerometer that may detect accelerations of the body 1002a, 1002b in one or more directions.

The example IMU 1016a, 1016b may also include a three-axis angular rate sensor that may detect an estimated velocity of the robot's body in one or more directions. Utilizing the estimated velocity detected by the angular rate sensor, the robot 200a, 200b may integrate the acceleration data detected by the accelerometer to determine an estimated position of the body 1002a, 1002b of the robot 200a, 200b. The robot 200a, 200b may determine the estimated position of the body at both time 1 and time 2, and may then compare the two positions to determine the second estimate of the distance 1018 travelled by the body of the robot 200a, 200b during the time period, as shown in FIG. 10A.

Figure 10B:
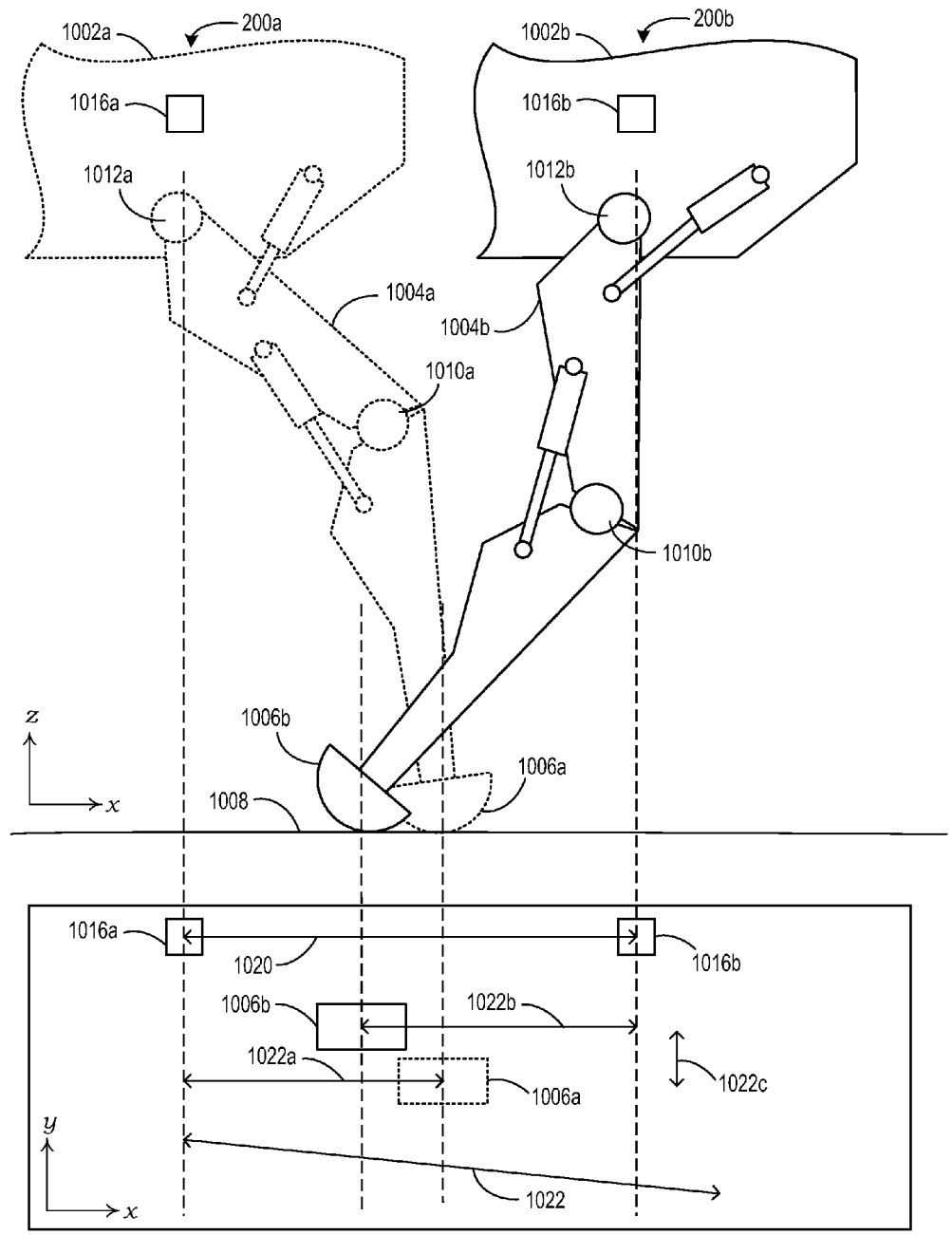
FIG. 10B illustrates the foot of the robot in contact with the ground surface, according to an example implementation.
Figure 10C:
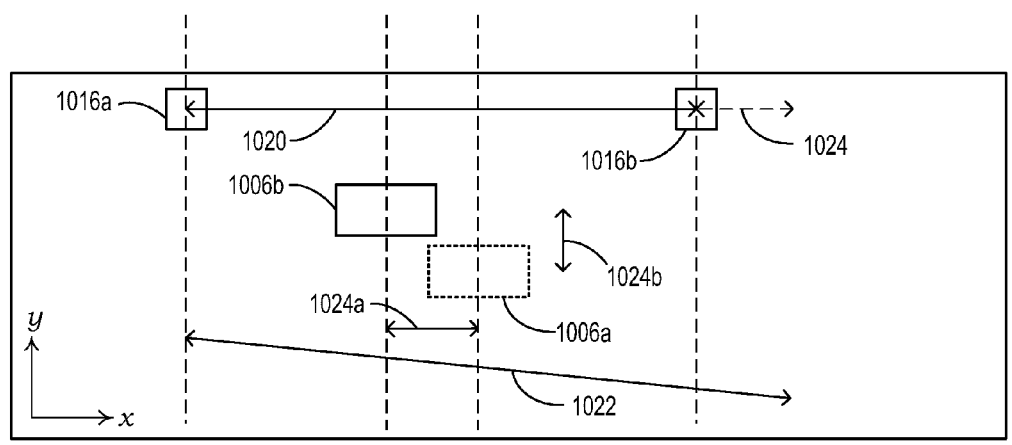
FIG. 10C illustrates the foot of the robot in contact with the ground surface, according to an example implementation.

Although the examples discussed herein and shown in the FIGS. 10A-10C relate to an IMU, other sensors may be used, alone or in combination, to detect the acceleration, velocity, and/or orientation of the robot to determine the second estimate of the distance travelled by the body of the robot. For instance, other sensors that may determine the second estimate may include RADAR, LIDAR, SONAR, VICON®, a GPS transceiver, two or more cameras enabling stereo vision, among other examples. Other sensors and other estimates that are not based on any foot of the robot in contact with the ground surface are also possible.

At block 906, the robot 200 may compare a difference between the first estimated distance and the second estimate distance to a threshold difference. Unlike the first estimated distance 1014 discussed above, the second estimated distance 1018 travelled by the body 1002a, 1002b of the robot 200a, 200b in the world frame is not based on the assumption that the foot 1006a, 1006b is in contact with and nonmoving with respect to the ground surface 1008. Thus, if the two estimates are the same or nearly the same, it may indicate that the assumption is true and the foot 1006a, 1006b has not moved with respect to the ground surface 1008. Such an example is illustrated in FIG. 10A.

Conversely, a significant difference between the first and second estimated distances may indicate that the assumption underlying the first estimate might not be true. FIG. 10B illustrates another example side view and top view of the robot 200a, 200b where the foot 1006a, 1006b has slipped between time 1 and time 2. Here, the second estimated distance 1020 determined based on the data from the IMU 1016a, 1016b may indicate the approximate distance travelled by the body 1002a, 1002b in the world frame.

However, the first estimated distance 1022 based on kinematic odometry, shown in FIG. 10B, might not approximate the distance travelled by the body 1002a, 1002b with respect to the ground. In other words, it might not approximate the distance travelled by the body 1002a, 1002b in the world frame. For example, if the foot 1006a, 1006b slips in both the forward and lateral directions (i.e., back and to the left) as shown in FIG. 10B, the first estimated distance 1022 may be the sum of line segments 1022a, 1022b, and the lateral component of the slip 1022c. Again, the line segments 1022a, 1022b, and 1022c are shown for purposes of illustration, and might not be individually determined by the robot 200a, 200b.

As shown in FIG. 10B, the first estimated distance 1022 may be greater than the distance actually travelled by the body 1002a, 1002b in the world frame, because the first estimated distance 1022 will include the distance of the slip. Although FIG. 10B illustrates a slip of the foot 1006a, 1006b in the forward and lateral directions, slips in the vertical direction are also possible, with similar effects.

FIG. 10C shows a top view of the foot 1006a, 1006b and the IMU 10106a, 1016b at both time 1 and time 2. FIG. 10C corresponds to the example shown in FIG. 10B, where the foot 1006a, 1006b has slipped. The first estimated distance 1022 and the second estimated distance 1020 are also shown, as well as the difference 1024 between the two distances 1022, 1020. The robot 200 may then compare the difference 1024 to the threshold difference, which may be represented by a variable E.

Although determining the first and second estimates of the distance travelled by the body 1002a, 1002b based on a single, scalar measurement may be sufficient to detect slips according to method 900, the robot 200a, 200b may also determine the first and second estimates of the distance travelled based on their component directions in order to identify the component direction in which a slip occurs.

For example, the robot 200a, 200b may determine the first and second estimates of the distance travelled in an x-, y-, and z-direction as well as the scalar estimates. The robot may then compare the first and second estimates in each direction to a threshold difference corresponding to each direction. Accordingly, the robot 200a, 200b may thus determine the particular direction(s) in which a given slip has occurred.

FIG. 10C shows the x-difference 1024a between the first and second estimates in the x-direction, as well as the y-difference 1024b in the y-direction. Because neither estimated distance included a distance travelled in the z-direction between time 1 or time 2, there may be no z-difference. Further, the distances 1020 and 1022 shown in FIG. 10C represent may represent scalar quantities, unassociated with any particular direction at time 1 and time 2. In some cases, the robot may compare the difference 1024 between the scalar distances to a scalar threshold difference, $\epsilon_{mag}$, in addition to the comparison in the three coordinate directions.

The threshold difference $\epsilon$ may indicate the distance below which a slip of the robot's foot 1006a, 1006b may be too small to cause a significant error to the robot's gait. Further, in some cases, the robot's potential reaction to a determined slip may further disrupt the gait of the robot 200a, 200b, and therefore it may be desirable to tolerate small slips of the robot's foot 1006a, 1006b and correct them in subsequent steps, rather than initiate an immediate reaction.

The threshold difference $\epsilon$ may be a predetermined or default value, and may be different between different robot configurations (e.g., the size of the robot). In some cases, the threshold difference may be between 1 and 50 centimeters. Other threshold differences are also possible. Further, the robot 200a, 200b may adjust the threshold difference at various times based on the gait of the robot 200a, 200b, the ground surface conditions detected by the robot 200a, 200b, or slips or other disturbances detected by the robot 200a, 200b, among other factors.

In some cases, the threshold difference $\epsilon$ may be not be equal for the different coordinate directions. For instance, some robots and/or gaits may be relatively more sensitive to slips in the lateral direction, making it desirable to detect and account for smaller slips that might otherwise be ignored if the slip was in, for instance, the forward direction. Therefore, the threshold $\epsilon_y$ may be smaller than $\epsilon_x$. Other examples are also possible.

In some examples, the robot 200a, 200b may determine the first and second estimates of the distance travelled by the body of the robot 200a, 200b, continuously throughout a given step. For instance, the robot 200a, 200b may detect the position and velocity of the foot 1006a, 1006b at a certain frequency, and then update via kinematic odometry the first estimate of the distance travelled by the body 1002a, 100b of the robot 200a, 200b at that frequency. Similarly, the robot 200a, 200b may detect the acceleration and velocity of the body 1002a, 1002b at a certain frequency, and then update via integration the second estimate of the distance travelled by the body 1002a, 100b of the robot 200a, 200b at that frequency.

The frequency at which the two estimated distances are determined might not be the same. For instance, the robot 200a, 200b may determine the first estimate based on kinematic odometry at a rate within the range of 1-1000 Hz. The robot 200a, 200b may determine the second estimate based on the IMU measurements at a slower rate, within the range of, for example, 1-100 Hz. The robot 200a, 200b may then compare the difference between the determined first and second estimates to the threshold difference when the estimates correspond to approximately the same points in time. For instance, when a second estimate is determined at the slower frequency, the robot 200a, 200b may use the most recently determined first estimate to determine the difference between estimates and compare it to the threshold.

At block 908, the robot 200b may determine that the difference between the first estimate and the second estimate exceeds the threshold difference. The determination may be based on the comparison of the differences in all three coordinate directions and the scalar direction, and may further be based on at least one of the differences exceeding its respective threshold.

At block 910, based on the determination that the difference exceeds the threshold difference, the robot 200b may cause the robot to react. For example, the robot 200b may take one or more actions based on the determination that a threshold difference has been exceeded. For example, the robot 200b may generate an indication of slip. The indication may be sent to systems within the robot 200b that may further respond to the slip or log the indication, among other examples.

Further, the robot 200b may include a second foot that is not in contact with the ground surface, and may cause the second foot to make contact with the ground surface based on the threshold being exceeded. For example, a slip may occur relatively early in a step, shortly after the foot 1006a is in stance. In such an example, a positional or rotational error in the robot's gait that was introduced by the slip may continue to accelerate until the second, swinging leg completes its swing trajectory and makes ground contact. However, in some situations, depending on the severity of the slip, the error may have grown too large for the second foot to arrest the error via ground reaction force control once it contacts the ground surface 1008. Therefore, it may be desirable for the second foot to end its swing early in order to more quickly make contact with the ground surface 1008 and engage in ground reaction force control.

In some cases, the rapid step down of a foot that ends its swing early based on a detected slip may result in a relatively hard contact with the ground surface 1008. This may lead to the detection of additional slips, particularly where the terrain is relatively loose, such as sand. This may result in another rapid step of the robot 200b, and thus a cycle of slip detections and reactions. Thus, in some cases, the robot's reaction to the initial determination that the threshold has been exceeded may additionally or alternatively include increasing the threshold difference.

For example, the robot 200b may incrementally increase the threshold difference such that a subsequent slip must be more severe than the initial slip, i.e., the difference between the first and second estimated distances must be greater than the initial slip for the robot 200b to react. This may include increasing one or more of $\epsilon_x$, $\epsilon_y$, $\epsilon_z$, or $\epsilon_{mag}$. The robot 200b may maintain the increased threshold difference for a predetermined period of time, or a predetermined number of steps of the robot 200b, so long as no additional slips are detected. Other examples are also possible.

Further, the robot 200b may react to slips that occur in each coordinate direction in a different way. For a slip detected in a given direction, the reaction of the robot 200b may include any of the reactions noted above, or other possible reactions, alone or in combination.

In some implementations, the example robot 200 may utilize operations from both flowcharts 700 and 900 to detect slips of the robot's foot and to further determine which foot of the robot slipped. For example, the robot 200 may determine the relative distances between a pair of feet in contact with the ground surface at time 1 and time 2 and compare their differences to a first threshold difference as shown in FIGS. 8A-8C and generally discussed above. Further, the robot 200 may determine first and second estimates of a distance travelled by the body of the robot during the time period (i.e., from time 1 to time 2) for each foot in the pair of feet, and then compare the differences for both feet to a second threshold difference.

Thus, when the robot 200 determines that the difference between the pair of feet between time 1 and time 2 has exceeded the first threshold difference, the robot 200 may also determine that the first and second estimates of the distance travelled by the body of the robot 200 during the same time period has exceeded the second threshold difference. Additionally, the robot 200 may identify the foot in the pair of feet as the foot that slipped.

C. Example Implementations for Handling Gait Disturbances

Some robots may operate in gaits that control the state changes of the legs of the robot based on a timer. For instance, a biped robot may operate in a timer-based walking gait that includes a swinging state and a stance state for the respective feet of the robot. As an example, the feet of the robot may, in an alternating pattern, contact the ground and remains in the stance state for one-half of a second, then lift off of the ground and swing forward for one-half of a second before stepping down again. The example biped robot walking in such a timer-based gait may engage in ground reaction force control to maintain the robot's balance and correct any errors that may occur in the gait. However, the timing of the gait may remain relatively constant.

Alternatively or additionally, an example robot according to some of the example implementations discussed herein may operate in a gait that is mechanically timed. For instance, the robot may determine when to end a given state of the robot's foot based on data that is received by the robot. As an example, the robot may determine when to end a stance state for a first foot based one an indication that a second foot in a swing state has made contact with the ground. A combination of a mechanically timed and a timer-based gait is also possible.

Figure 11:
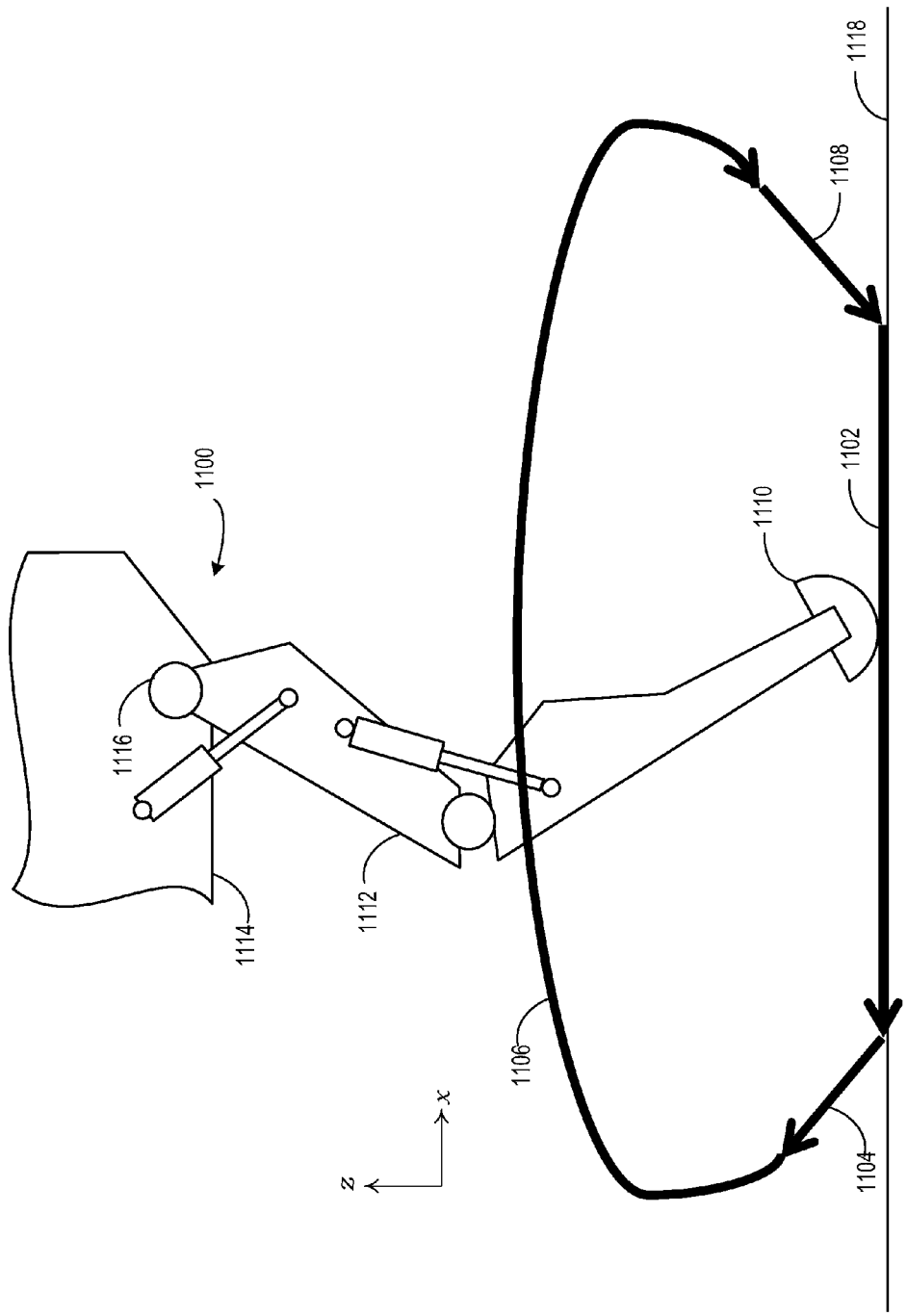
FIG. 11 illustrates leg states in a mechanically timed gait of a robot, according to an example implementation.

FIG. 11 is an example illustration showing leg states in a mechanically timed gait of an example robot 1100. The robot 1100 may be, for example, the biped robot 400 shown in FIG. 4, or one of the quadruped robots 200, 300 shown in FIGS. 2 and 3. Four leg states are shown: a Stance state 1102, a Lift_Up state 1104, a Swing_Forward state 1106, and a Step_Down state 1108. The arrows signifying each state may represent the trajectory of the foot 1110 of the robot 1100 with respect to the connection point between the robot's leg 1112 and its body 1114—in other words, the robot's hip 1116.

The robot 1100 may determine the end of each state of the robot's leg based on one or more events that may be detected by the robot 1100. For example, during the Stance state 1102, the foot 1110 may be in contact with the ground surface 1118 and the robot 1100 may engage in ground reaction force control to support the robot's weight and maintain its balance. The Stance state 1102 may end when the robot 1100 detects that i) a second foot that is in the Swing state 1104 has made ground contact, ii) the leg 1112 has reached a range of motion limit in one or more joints in the leg 1112, iii) the foot 1110 has lost contact with the ground surface 1118, among other possibilities. Other examples are also possible.

Each joint in the stance leg 1112, such as a knee, ankle or hip joint, may include actuators for moving the joint that have a limited range of motion. If one of the actuators reaches a limit of its range of motion, it may no longer be able to cause the leg 1112 to exert a force in particular direction. In some examples, a range of motion limit might be an extension or a retraction limit for a linear actuator, or a rotational limit for a rotary actuator. Other examples are also possible. If a limit is reached, the robot 1100 may not be able to effectively engage in ground reaction force control using the stance leg 1112, and may thus end the Stance state 1102.

The Lift_Up state 1104 may be brief, and may correspond to the foot 1110 lifting off of the ground at a desired velocity with respect to the robot's body 1114. The desired velocity may have forward, lateral, and vertical components. For example, the robot 1100 may first determine the current velocity of the stance foot 1110 with respect to the body 1114 in the forward (x-axis) direction. If it is assumed that the stance foot 1110 is in contact with the ground surface 1118 and is not slipping, the velocity of the stance foot 1110 with respect to the body 1114 in the forward (x-axis) direction may be equal to and opposite the velocity of the robot's body 1114 with respect to the ground 1118 in the forward (x-axis) direction. The robot may determine, in other words, an estimate of the robot's current forward velocity.

In some cases, the desired velocity for the foot 1110 in the Lift_Up state 1104 may have a forward component that is equal to and opposite the current forward velocity of the robot 1100. The foot 1100 in the Lift_Up state 1104 may also lift off of the ground with vertical and lateral velocity components that might not be determined based on the current forward velocity of the robot 1100. The Lift_Up state 1104 may end when the robot 1100 detects that the foot 1110 loses contact with the ground surface 1118.

During the Swing_Forward state 1106, the foot 1110 of the robot 1100 may follow a smooth trajectory to a determined swing height, then follow the trajectory toward a determined step down location. The Swing_Forward state 1106 may end when i) the foot 1110 reaches the end of the trajectory or ii) makes contact with the ground surface 1118.

The Step_Down state 1108 may be brief, and may correspond to the foot 1110 approaching the ground at a determined velocity with respect to the robot's body 1114. Similar to the Lift_Up state 1102, the determined velocity may have forward, lateral, and vertical components, and the forward component may be equal to an opposite the current forward velocity of the robot with respect to the ground surface 1118. The Step_Down state 1108 may end when the robot 1100 detects that i) the foot 1110 has made contact with the ground surface 1118, ii) the leg 1112 has reached a range of motion limit in one or more joints in the leg 1112, or iii) the foot 1110 has not made contact with the ground surface 1118 within a nominal time that was determined for the Swing_Forward state 1106 and the Step_Down state 1108.

For example, if the leg 1112 reaches a range of motion limit in one or more of its joints during the Step_Down state 1108 without contacting the ground surface 1118, the robot 1100 may eventually tip over if the leg 1112 continues in the Step_Down state 1108 and the stance leg continues in the Stance state 1102. Thus, the robot 1100 may lift up the stance leg, lowering the robot's body 1114, and transition the leg 1112 from the Step_Down state 1108 into the Stance state 1102 to catch the robot 1100 when it lands. Further, the robot 1100 might not be able to fully engage in ground reaction force control if the foot 1110 in the Step_Down state 1108 makes contact with the ground surface 1118 if it has reached a range of motion limit. Thus, the robot 1100 may also transition the foot 1110 into the Stance state 1102 in order to regain some of the range of motion in the leg 1112.

Further, although the transitions between leg states shown in FIG. 11 might not be determined based on a timer, the robot 1100 may nonetheless determine an anticipated time for the first foot 1100 to complete the Swing_Forward state 1106 and the Step_Down state 1108. If the robot 1100 determines that the foot 1110 has not made contact with the ground surface 1118 within the estimated time, or within a threshold deviation from the estimated time, it may indicate that the robot 1100 has, for example, stepped off of a ledge. Rather than continuing to step down at the risk of, perhaps, tipping over, the robot 1100 may transition the leg 1112 to the Stance state 1102 and further lift up the current stance leg, as noted above.

For each of the leg states discussed above, there may be additional conditions or fewer conditions that may cause the robot 1100 to end a given state. Further, some mechanically timed gaits may include more or fewer states, which may serve additional purposes based on the gait and the particular robot.

In some instances, the robot 1100 may adjust the timing of a mechanically timed gait to handle detected disturbances to the gait, among other possible responses. Some example disturbances have been discussed above, such as a slip of the robot's foot, or an indication that a leg actuator has reached a range of motion limit. Other examples are also possible.

1. First Example Implementation for Handling Gait Disturbances

Figure 12:
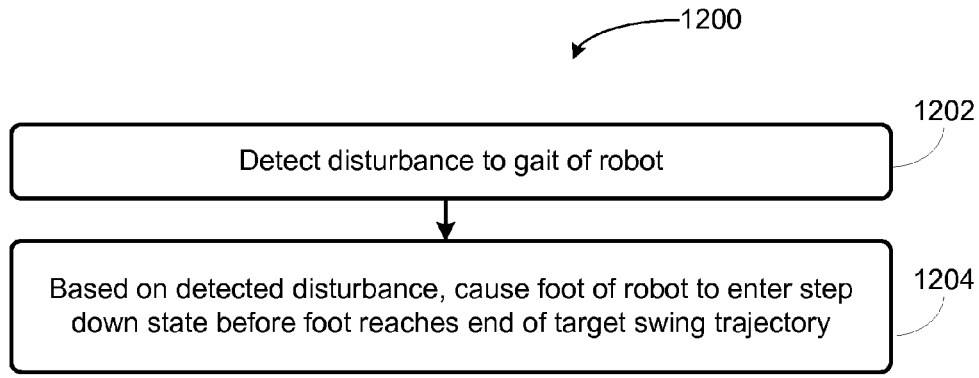
FIG. 12 is a flowchart according to an example implementation.

FIG. 12 is a flowchart 1202 illustrating operations for handling disturbances to the gait of a robot. At block 1202, a robot may detect a disturbance to a gait of the robot. The robot may be any of the example robots noted above, among other possibilities. For ease of comparison with some of the other example methods noted above, the flowchart 1200 will be discussed with respect to the robot 200 shown in FIG. 2. However, the flowchart 1200 and the examples described below may also be carried out by robots having other configurations, such as the biped robot 400 shown in FIG. 4.

The gait of the robot 200 may include a swing state and a step down state, and the swing state may include a target swing trajectory for the foot of the robot 200. The target swing trajectory may have a beginning and an end, as well as other attributes that are determined by the robot 200 to obtain or maintain a desired velocity of the robot 200 or to avoid obstacles, among other possibilities. For example, the target swing trajectory may include a target swing height. The target swing trajectory may be determined by the robot 200 before the disturbance is detected.

Disturbances may generally refer to any event or effect that may disrupt or potentially disrupt the robot's gait. For instance, the gait of the robot 200 may also include a stance state, and a second foot of the robot may be in the stance state while the first foot is in the swing state. Referring to the example shown in FIG. 8A-8B, the first foot may be the foot 802a, 802b and the second foot may be foot 808. Thus, the disturbance detected by the robot 200 at block 1202 may be a slip of the robot's stance foot, as shown in FIG. 8B.

As another example, the detected disturbance may be an indication that the target swing trajectory of the robot's foot is within a threshold distance of the stance leg of the robot 200. This may indicate, for instance, that a possible collision between the legs of the robot may occur during the swing trajectory. For example, the robot 200 may include sensors in its legs that may detect the position of the legs with respect to the robot's body. This may allow the robot 200 to determine that a target swing trajectory of a swinging leg may intersect or nearly intersect with the current position of the stance leg. In some cases, detecting such an indication of a possible leg collision may be a disturbance that causes a reaction by the robot.

As yet another example, the detected disturbance may be an indication that an actuator in one of the leg joints of the stance leg has reached a range of motion limit, thereby limiting the stance leg's ability to engage in ground reaction force control. Other examples of disturbances that may be detected by the robot, alone or in combination, one or more of the examples noted above, are also possible.

At block 1204, based on the detected disturbance, the robot 200 may cause the foot of the robot to leave the swing state and enter the step down state before the foot reaches the end of the target swing trajectory. For instance, the robot 200 may cause the swing foot to step down early and contact the ground surface at a location different than a target location determined as part of the gait.

In some cases, the robot 200 may determine a desired velocity for the foot with respect to the robot's body. The robot may then cause the foot of the robot 200 to make contact with the ground surface at the end of the step down state at the desired velocity. The desired velocity may have a forward component, as well as lateral and vertical components. The robot 200 may base the desired velocity for the foot in part on the current velocity of the robot 200 with respect to the ground surface. For example, before determining the desired velocity for the foot, the robot 200 may determine the current velocity of a stance foot with respect to the robot's body in the forward (x-axis) direction based on received position and velocity sensor data and forward kinematics. If it is assumed that the stance foot is in contact with the ground surface and is not slipping, the velocity of the stance foot with respect to the body in the forward (x-axis) direction may be equal to and opposite the velocity of the robot's body with respect to the ground in the forward (x-axis) direction. The robot 200 may determine, in other words, an estimate of the robot's forward velocity.

In some cases, the forward component of the desired velocity determined by the robot 200 for the foot in the step down state may be equal to and opposite the forward component of the current velocity of the robot 200 with respect to the ground surface. The robot 200 may also determine vertical and lateral velocity components for the foot in the step down state. These velocity components might not be based on the current forward velocity of the robot 200.

The robot 200 may react to the detected disturbance in other ways as well. For instance, for some detected slips of the stance foot, the robot 200 may detect that the second stance foot has lost contact with the ground surface. Based on detecting that the second foot has lost contact with the ground surface, the robot 200 may cause the second foot to make contact with the ground surface by extending the second leg. For example, the robot 200 may cause the second foot to discontinue ground reaction force control, and instead engage in position control by reaching the foot down to reacquire ground contact. Once ground contact is reestablished, the second foot may resume ground reaction force control.

In some cases, a detected slip of the robot's second foot may exceed a threshold slip distance. The threshold slip distance may be determined by the robot 200 before the slip is detected. Two such examples are shown in FIGS. 8A-8C and 10A-10C, and other examples are also possible. Based on the detected disturbance of the slip that is greater than the threshold slip distance, and before causing the foot to enter the step down state, the robot may increase the threshold slip distance such that a subsequent slip must be more severe than the previous slip. This may avoid a cycle of slip detections and reactions, particularly for terrain that is relatively loose, where the rapid step down of a foot that ends its swing early based on the detected slip may result in a relatively hard contact with the ground surface.

Further, in some cases the robot 200 may determine a first representation of a coefficient of friction between the foot of the robot 200 and the ground surface. The robot 200 may use the determined representation of the coefficient of friction to determine a threshold orientation for a ground reaction force that may act upon the foot. Examples of such a threshold orientation are shown in in FIGS. 6A-6D, and other examples are also possible. Based on the detected disturbance of the slip of the robot's foot, and before causing the foot to enter the step down state, the robot may update the representation of the coefficient of friction such that the updated representation is less than the first representation. Consequently, the robot may adjust the ground reaction forces that act upon the robot's feet to require less friction, which may reduce the likelihood of another slip occurring.

Other reactions by the robot to a detected disturbance to the gait of the robot are also possible, and may be implemented by the robot alone or in any combination with the examples discussed herein.

2. Second Example Implementation for Handling Gait Disturbances

Figure 13:
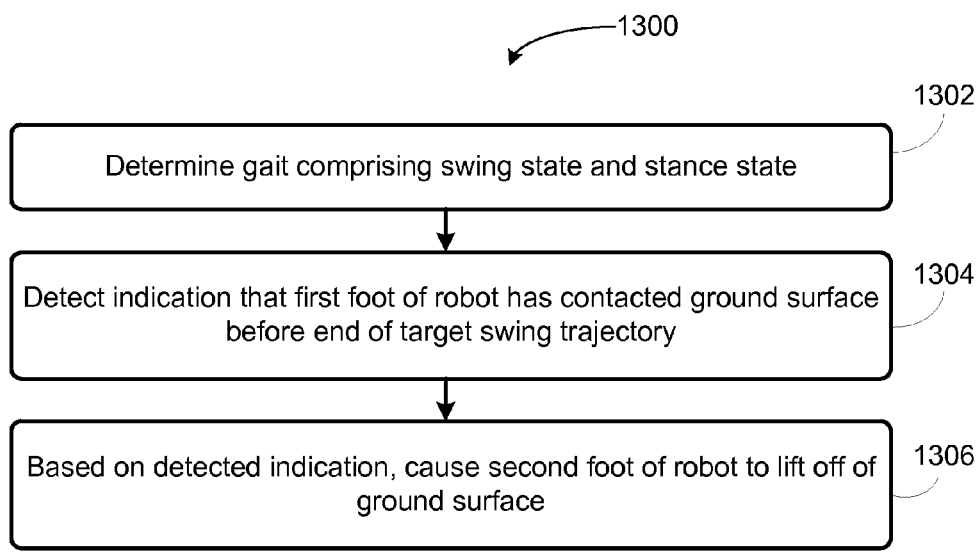
FIG. 13 is a flowchart according to an example implementation.

FIG. 13 is a flowchart 1300 illustrating operations for handling disturbances to the gait of a robot. Specifically, flowchart 1300 is an example implementation that may be performed by a robot that detects an indication that a foot in a swinging state made early contact with the ground surface, before the end of its planned trajectory.

At block 1302, a robot having a first foot and a second foot may determine a gait for the robot. The robot may be any of the example robots noted above, among other possibilities. For ease of comparison with some of the other example methods noted above, the flowchart 1500 will be discussed with respect to the robot 200 shown in FIG. 2. However, the flowchart 1500 and the examples described below may also be carried out by robots having other configurations, such as the biped robot 400 shown in FIG. 4, unless noted otherwise.

The determined gait of the robot 200 may include a swing state and a stance state, and the swing state may include a target swing trajectory for the first foot of the robot 200. The target swing trajectory may have a beginning and an end, as well as other attributes that are determined by the robot 200 to obtain or maintain a desired velocity of the robot 200 or to avoid obstacles, among other possibilities. For example, the target swing trajectory may include a beginning position, a target swing height, and an end position, each with respect to the robot's hip, among other possibilities. The target swing trajectory may be determined by the robot 200 before the disturbance is detected.

At block 1304, the robot 200 may detect an indication that the first foot of the robot has contacted a ground surface before the end of the target swing trajectory. For example, the robot 200 may encounter relatively uneven terrain where the ground surface may rise or fall unexpectedly.

Figure 14:
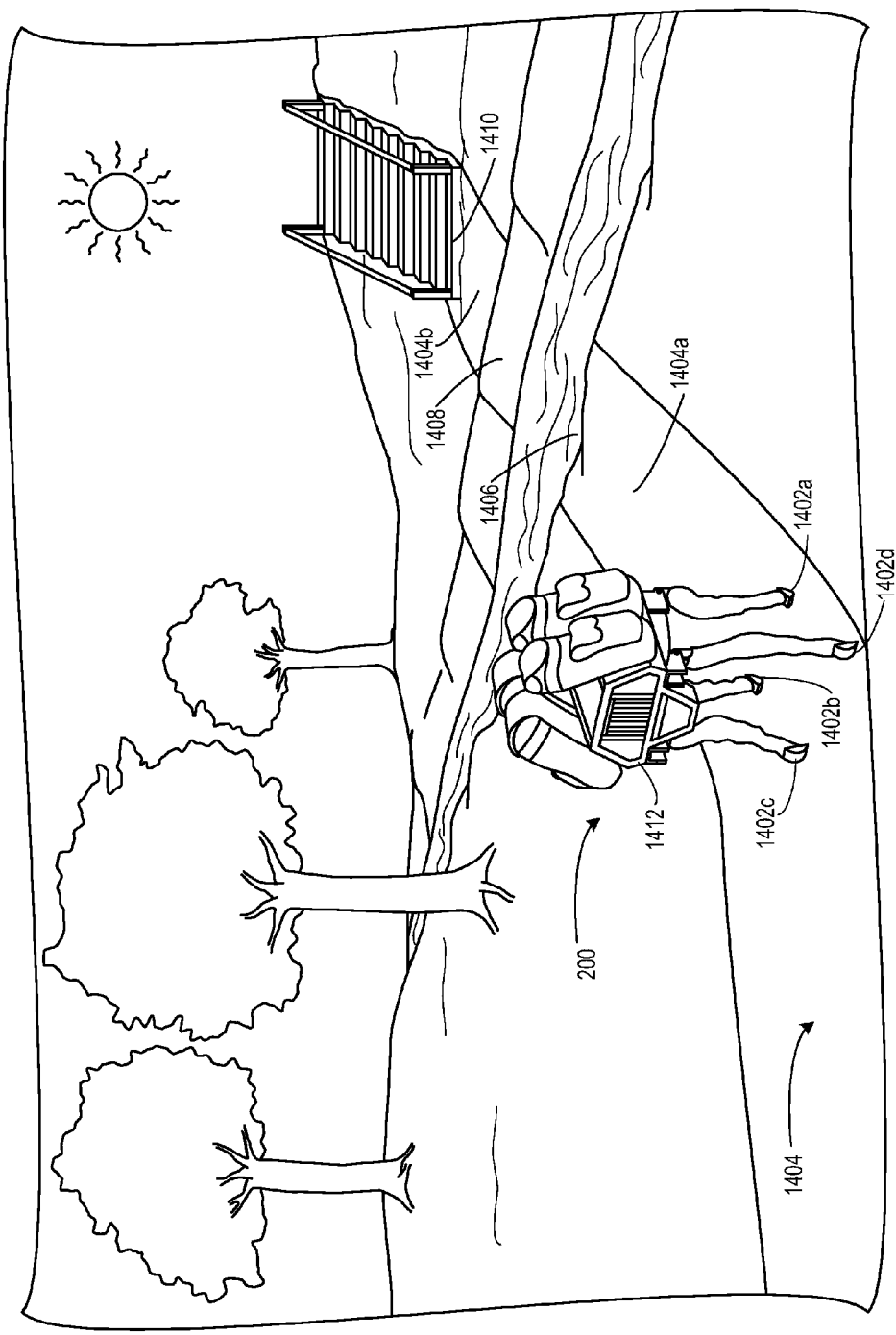
FIG. 14 illustrates an example robot traversing a path that includes uneven terrain.

FIG. 14 shows an example of the robot 200 with legs 1402 traversing a path 1404. The path 1404 may include sections that have a relatively even ground surface 1404a, 1404b. The path 1404 may also include sections that are relatively uneven. For instance, the ground surface may include a relatively rapid decline or drop-off, such as the stream 1406, or a relatively rapid incline or step-up, such as the hill 1408 or the stairs 1410.

When the robot 200 traverses the path 1404 and reaches the hill 1408 or the steps 1410, the right front foot 1402a (i.e., the first foot) may be in the swing state. The target swing trajectory of the first foot may approximate a relatively even ground surface. However, the first foot 1402a may make contact with the ground surface a portion of the way up the hill, or on the first step. Either of these locations may correspond to a point in the target swing trajectory that is before the end of the trajectory. Other examples of uneven and/or unpredictable ground surfaces are also possible.

At block 1306, the robot 200 may, based on the detected indication that the first foot has contacted the ground surface, cause the second foot to lift off of the ground surface. For instance, in an example case of a biped robot, and for some gaits of a quadruped robot, the indication of the early ground contact by the first foot may cause the robot to transition the first foot to the stance state, and transition the second foot to the swing state. In the example shown in FIG. 14, the robot 200 may be traversing the path 1404 in a gait where the second foot 1402b, may lift off of the ground surface when the first foot 1402a makes contact.

However, for some situations involving a biped, quadruped, or other type of robot, the robot may react in one or more additional ways to the indication of the early ground contact, before causing the second foot to lift off of the ground. In some cases, the robot 200 may detect an indication that a third leg of the robot 200 has contacted the ground surface, and then cause the second foot to lift off of the ground surface based on this additional indication.

For example, the quadruped robot 200 shown in FIG. 14 may traverse the path 1404 in a trotting gait, where the first foot 1402a and the third foot 1402c are in the swing state at approximately the same time. After detecting that the first leg has made an early ground contact with, for example, the hill 1408, the robot 200 may wait for the third leg to continue its target swing trajectory before lifting the second foot 1402b and fourth foot 1402d off of the ground. This may allow the robot 200 to maintain two stance legs in contact with the ground surface to engage in ground reaction force control.

In another example, the robot 200 may detect an indication of an early touchdown location for the first foot. The robot 200 may further determine a desired touchdown location for the first foot, and then cause the second foot to lift off of the ground surface based on a determination that the early touchdown location is diverging from the desired touchdown location. For example, as the first foot 1402a of the robot 200 progresses through the target swing trajectory, the robot 200 may continuously determine a desired touchdown location for the first foot 1402a that would, if the first foot 1402a were to touch down at that moment, allow the robot 200 to maintain its balance, continue operating in its current gait, at its current velocity, among other considerations. Thus, the desired touchdown location for the first foot 1402a may generally progress forward, in the direction of the robot's gait, as the robot's body 1412 moves forward over the second foot, in stance, and the first foot 1402a is in a swinging state.

For example, the first foot 1402a of the robot 200 shown in FIG. 14 may make contact with the stairs 1410 relatively late in the target swing trajectory, when the first foot 1402a is extended in front of the robot 200. Therefore, the early touchdown location may be ahead of the desired touchdown location. Further, the desired touchdown location may be moving forward, toward the early touchdown location as the robot's body 1412 continues to move forward on its second foot, in stance. In this situation, it may be desirable to keep the second foot in the stance state while the location of the first foot 1402a, with respect to the desired location and the robot's overall balance, is improving. Thus, the robot may wait until the desired touchdown location has moved past the early touchdown location, or is otherwise diverging from the early touchdown location of the first foot 1402a before causing the second foot of the robot to lift of off the ground surface and transitioning the first foot 1402a into stance.

Additionally, the robot 200 may, before detecting the indication of the early ground contact of the first foot 1402a, determine a target ground reaction force for the first foot 1402a. Then, based on the detected indication of the early ground contact, the robot 200 may determine an adjusted ground reaction force for the first foot that is less than the target ground reaction force. For example, the adjusted ground reaction force may be a minimal force, approximately one tenth of the target ground reaction force. The robot 200 may then cause the first foot 1402a to apply a force to the ground surface approximately equal to and opposing the adjusted ground reaction force before causing the second foot 1402b to lift off of the ground surface. The adjusted ground reaction force may maintain contact between the first foot 1402a and the ground surface as the robot 200 waits for an additional indication, such as those described above. Other possibilities exist.

Further, the force applied to the robot 200 from the early ground contact of the first foot 1402a may act as a disturbance to the gait of the robot 200. Therefore, in some examples the robot 200 may, before causing the second foot 1402b to lift off the ground surface, determine a first force exerted on the robot 200 based on the first foot 1402a contacting the ground surface before the end of the target swing trajectory. Based on the first force, the robot 200 may determine a second force that opposes the first force. The robot 200 may then cause the second foot 1402b to apply the second force to the robot 200 via contact with the ground surface, before causing the second foot 1402b to lift off of the ground surface. Alternatively or additionally, the robot 200 may cause the fourth foot 1402d to apply the second force to the robot via contact with the ground surface before causing the fourth foot 1402d to lift off of the ground surface. In this way, the robot 200 may correct the gait disturbance that may result from the early ground contact of the first foot 1402a.

The reactions discussed above may be implemented by an example robot alone or in combination, and other reactions are also possible. Further, unless noted otherwise (e.g., where a reaction requires a third leg) the reactions may be carried out a by either a biped or a quadruped robot, among other robot configurations.

3. Third Example Implementation for Handling Gait Disturbances

Figure 15:
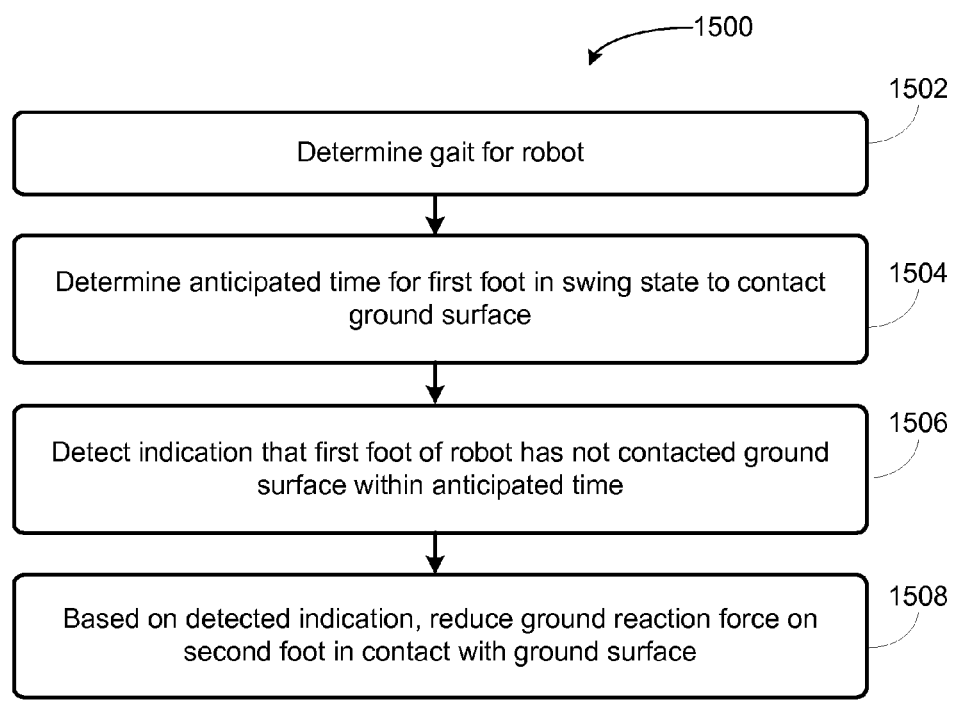
FIG. 15 is a flowchart according to an example implementation.

FIG. 15 is a flowchart 1500 illustrating operations for handling disturbances to the gait of a robot. Specifically, flowchart 1500 is an example implementation that may be performed by a robot that detects an indication that a foot in a swinging state made early contact with the ground surface, before the end of its planned trajectory.

At block 1502, a robot having a first foot and a second foot may determine a gait for the robot. The determined gait of the robot may include a swing state and a stance state. The robot may be any of the example robots noted above, among other possibilities. For ease of comparison with some of the other example methods noted above, the flowchart 1500 will be discussed with respect to the robot 200 shown in FIG. 2. However, the flowchart 1500 and the examples described below may also be carried out by robots having other configurations, such as the biped robot 400 shown in FIG. 4.

At block 1504, the robot 200 may determine an anticipated time for the first foot of the robot in the swing state to contact a ground surface. Although the transitions between the leg states of the determined gait might not be determined based on a timer, the robot 200 may nonetheless determine an anticipated time for the first foot 1402a to complete a target swing trajectory and make contact with the ground surface.

At block 1506, the robot 200 may detect an indication that the first foot 1402a of the robot has not contacted the ground surface within the anticipated time. For example, the robot 200 may encounter relatively uneven terrain where the ground surface may rise or fall unexpectedly.

Returning to FIG. 14, the robot 200 may traverse the path 1404 and reach the stream 1406 as the first foot 1402a is in the swing state. The anticipated time for the first foot 1402a to contact a ground surface may anticipate a relatively even ground surface. Thus, some steps of the robot on uneven terrain may result in a late ground contact with respect to the anticipated time.

However, the first foot 1402a may step down over the edge of the stream. Similarly, the robot 200 traversing the path 1404 shown in FIG. 14 in the opposite direction may encounter the stairs 1410 from the top. Thus, the first foot 1402a may have to step down to reach the first stair. In either case, the first foot 1402a might not make contact with the ground surface within the anticipated time. Other examples of uneven and/or unpredictable ground surfaces are also possible.

At block 1508, the robot may, based on the detected indication, reduce a ground reaction force on the second foot in contact with the ground surface. For example, in some cases the robot 200 may reduce the ground reaction force on the second foot 1402b to lower the body 1412 of the robot on the second foot with respect to the ground. The robot 200 may, for instance, lower the elevation of the robot's hip coupled to the second foot 1402b.

Lowering the body 1412 of the robot 200 on the second foot 1402b may result in the first foot 1402a making contact with the ground surface. For example, the first foot 1402a may make contact with the bottom of the stream 1406, or the first stair down from the top of the stairs 1410, and may then transition into the stance state.

In some examples, the robot 200 may lower the body 1412 until the robot detects one of i) an indication that the first foot 1402a of the robot 200 contacted the ground, or ii) an indication that the body has been lowered a threshold distance. For instance, the stream 1406 shown in FIG. 14 may be relatively deep. Further, the robot 200 may encounter the top of the stairs 1412 when the first foot 1402a is following a relatively long swing trajectory, such that the first foot 1402a may extend beyond the first stair when it steps down.

If ground contact is not made before the threshold is reached, the robot 200 may detect an indication that the body 1412 has been lowered the threshold distance. Based on the detected indication, the robot 200 may cause the first foot 1402a to enter the stance state and cause the second foot 1402b to enter the swing state. The robot may further cause the first foot 1402a to engage in position control by reaching the foot down to reacquire ground contact. Once ground contact is reestablished, the first foot 1402a may resume ground reaction force control.

The reactions discussed above may be implemented by an example robot alone or in combination, and other reactions are also possible. Further, unless noted otherwise the reactions may be carried out a by either a biped or a quadruped robot, among other robot configurations.

IV. CONCLUSION

While various implementations and aspects have been disclosed herein, other aspects and implementations will be apparent to those skilled in the art. The various implementations and aspects disclosed herein are for purposes of illustration and are not intended to be limiting, with the true scope and spirit being indicated by the following claims.

We claim:

1. A method comprising:
   determining, by a robot having at least one foot, a representation of a coefficient of friction between the foot and a ground surface;
   determining, by the robot, a representation of a gradient of the ground surface;
   based on the determined representations of the coefficient of friction and the gradient, determining, by the robot, a threshold orientation for a target ground reaction force on the foot of the robot during a footstep of the robot;

determining, by the robot, the target ground reaction force, wherein the target ground reaction force comprises a magnitude and an orientation;

determining, by the robot, an adjusted ground reaction force by adjusting the orientation of the target ground reaction force to be within the determined threshold orientation; and causing the foot of the robot to apply a force on the ground surface approximately equal to and opposing the adjusted ground reaction force during the footstep.

2. The method of claim 1, wherein the adjusted ground reaction force is the target ground reaction force.

3. The method of claim 1, wherein the representation of the coefficient of friction between the foot and the ground surface is a first representation, wherein the threshold orientation is a first threshold orientation, wherein the target ground reaction force is a first target ground reaction force, wherein the force applied by the foot is a first force, and wherein the adjusted ground reaction force is a first adjusted ground reaction force, the method further comprising:

determining, by the robot, a second representation of the coefficient of friction between the foot and the ground surface, wherein the second representation is greater than the first representation;

based on the determined second representation of the coefficient of friction and the determined representation of the gradient, determining, by the robot, a second threshold orientation for a second target ground reaction force on the foot of the robot during the footstep;

determining, by the robot, the second target ground reaction force, wherein the second target ground reaction force comprises a magnitude and an orientation;

determining, by the robot, a second adjusted ground reaction force by adjusting the orientation of the second target ground reaction force to be within the determined second threshold orientation; and after causing the foot of the robot to apply the first force on the ground surface approximately equal to and opposing the first adjusted ground reaction force during the footstep, causing the foot of the robot to apply a second force on the ground surface approximately equal to and opposing the second adjusted ground reaction force during the footstep.

4. The method of claim 3, wherein causing the foot of the robot to apply the second force on the ground surface approximately equal to and opposing the second adjusted ground reaction force during the footstep comprises adjusting the orientation of the first force applied by the foot during the footstep.

5. The method of claim 3, wherein the second adjusted ground reaction force is the second target ground reaction force.

6. The method of claim 3, wherein determining the second threshold orientation for the second target ground reaction force on the foot of the robot during the footstep comprises determining the second threshold orientation for the second target ground reaction force on the foot of the robot during the footstep after a determined time period.

7. The method of claim 6, wherein the footstep of the robot comprises an estimated duration, the method further comprising:

determining, by the robot, the time period to be approximately half of the estimated duration of the footstep.

8. The method of claim 3, the method further comprising:

detecting, by the robot, an indication of an increase of the gradient of the ground surface, wherein determining the second representation of the coefficient of friction is based on the detected indication of the increase of the gradient.

9. The method of claim 1, wherein the threshold orientation is approximated by a cone pointing toward the ground surface, wherein the cone comprises a center axis perpendicular to the ground surface, wherein the target ground reaction force is a first target ground reaction force, wherein the force applied by the foot is a first force, and wherein the adjusted ground reaction force is a first adjusted ground reaction force, the method further comprising:

detecting, by the robot, an indication of an increase of the gradient of the ground surface;

based on the detected indication of an increase of the gradient, determining, by the robot, an adjusted threshold orientation for a second target ground reaction force wherein the center axis of the cone approximating the threshold orientation approaches a gravity vector;

determining, by the robot, the second target ground reaction force, wherein the second target ground reaction force comprises a magnitude and an orientation;

determining, by the robot, a second adjusted ground reaction force by adjusting the orientation of the second target ground reaction force to be within the adjusted threshold orientation; and after causing the foot of the robot to apply the first force on the ground surface approximately equal to and opposing the first adjusted ground reaction force during the footstep, causing the foot of the robot to apply a second force on the ground surface approximately equal to and opposing the second adjusted ground reaction force during the footstep.

10. The method of claim 1, wherein the representation of the coefficient of friction between the foot and the ground surface is a first representation, wherein the threshold orientation is a first threshold orientation, wherein the target ground reaction force is a first target ground reaction force, wherein the force applied by the foot is a first force, and wherein the adjusted ground reaction force is a first adjusted ground reaction force, the method further comprising:

detecting, by the robot, an indication of a slip of a second foot of the robot;

based on the detected indication of the slip, determining, by the robot, a second representation of a coefficient of friction between the foot and the ground surface, wherein the second representation is less than the first representation;

based on the determined second representation and the determined representation of the gradient, determining, by the robot, a second threshold orientation for a second target ground reaction force for the foot of the robot on the ground surface during the footstep;

determining, by the robot, the second target ground reaction force, wherein the second target ground reaction force comprises a magnitude and an orientation;

determining, by the robot, a second adjusted ground reaction force by adjusting the orientation of the second target ground reaction force to be within the second threshold orientation; and before causing the foot of the robot to apply the first force on the ground surface approximately equal to and opposing the first adjusted ground reaction force during the footstep, causing the foot of the robot to apply a second force on the ground surface approximately equal to and opposing the second adjusted ground reaction force during the footstep.

11. A robot comprising:
at least one foot;
a processor;
a non-transitory computer readable medium; and
program instructions stored on the non-transitory computer readable medium that, when executed by the processor, cause the robot to perform functions comprising:
   determining, by the robot, a representation of a coefficient of friction between the foot and a ground surface;
   determining, by the robot, a representation of a gradient of the ground surface;
   based on the determined representations of the coefficient of friction and the gradient, determining a threshold orientation for a target ground reaction force on the foot of the robot during a footstep of the robot;
   determining the target ground reaction force, wherein the target ground reaction force comprises a magnitude and an orientation;
   determining an adjusted ground reaction force by adjusting the orientation of the target ground reaction force to be within the determined threshold orientation; and
   causing the foot of the robot to apply a force on the ground surface approximately equal to and opposing the adjusted ground reaction force during the footstep.

12. The robot of claim 11, wherein the adjusted ground reaction force is the target ground reaction force.

13. The robot of claim 11, wherein the representation of the coefficient of friction between the foot and the ground surface is a first representation, wherein the threshold orientation is a first threshold orientation, wherein the target ground reaction force is a first target ground reaction force, wherein the force applied by the foot is a first force and wherein the adjusted ground reaction force is a first adjusted ground reaction force, and wherein the program instructions, when executed by the processor, further cause the robot to perform functions comprising:
   determining a second representation of the coefficient of friction between the foot and the ground surface, wherein the second representation is greater than the first representation;
   based on the determined second representation of the coefficient of friction and the determined representation of the gradient, determining a second threshold orientation for a second target ground reaction force on the foot of the robot during the footstep;
   determining the second target ground reaction force, wherein the second target ground reaction force comprises a magnitude and an orientation;
   determining a second adjusted ground reaction force by adjusting the orientation of the second target ground reaction force to be within the determined second threshold orientation; and
   after causing the foot of the robot to apply the first force on the ground surface approximately equal to and opposing the first adjusted ground reaction force during the footstep, causing the foot of the robot to apply a second force on the ground surface approximately equal to and opposing the second adjusted ground reaction force during the footstep.

14. The robot of claim 13, wherein the program instructions for causing the foot of the robot to apply the second force on the ground surface approximately equal to and opposing the second adjusted ground reaction force during the footstep comprise program instructions for adjusting the orientation of the first force applied by the foot during the footstep.

15. The robot of claim 13, wherein the second adjusted ground reaction force is the second target ground reaction force.

16. The robot of claim 13, wherein the program instructions for causing the foot of the robot to apply a second force on the ground surface approximately equal to and opposing the second adjusted ground reaction force during the footstep comprise program instructions for causing the foot of the robot to apply a second force on the ground surface approximately equal to and opposing the second adjusted ground reaction force after a determined time period.

17. The robot of claim 16, wherein the footstep of the robot comprises an estimated duration, and wherein the program instructions, when executed by the processor, further cause the robot to perform functions comprising:
   determining the time period to be half of the estimated duration of the footstep.

18. The robot of claim 13, wherein the program instructions, when executed by the processor, further cause the robot to perform functions comprising:
   detecting an indication of an increase of the gradient of the ground surface, wherein determining the second representation of the coefficient of friction is based on the detected indication of the increase of the gradient.

19. The robot of claim 11, wherein the threshold orientation is approximated by a cone pointing toward the ground surface, wherein the cone comprises a center axis perpendicular to the ground surface, wherein the target ground reaction force is a first target ground reaction force, wherein the adjusted ground reaction force is a first adjusted ground reaction force, wherein the force applied by the foot is a first force, and wherein the program instructions, when executed by the processor, further cause the robot to perform functions comprising:
   detecting an indication of an increase of the gradient of the ground surface;
   based on the detected indication of an increase of the gradient, determining an adjusted threshold orientation for a second target ground reaction force wherein the center axis of the cone approximating the threshold orientation approaches a gravity vector;
   determining the second target ground reaction force, wherein the second target ground reaction force comprises a magnitude and an orientation;
   determining a second adjusted ground reaction force by adjusting the orientation of the second target ground reaction force to be within the adjusted threshold orientation; and
   after causing the foot of the robot to apply the first force on the ground surface approximately equal to and opposing the first adjusted ground reaction force during the footstep, causing the foot of the robot to apply a second force on the ground surface approximately equal to and opposing the second adjusted ground reaction force during the footstep.

20. The robot of claim 11, wherein the representation of the coefficient of friction between the foot and the ground surface is a first representation, wherein the threshold orientation is a first threshold orientation, wherein the target ground reaction force is a first target ground reaction force, wherein the adjusted ground reaction force is a first adjusted ground reaction force, wherein the force applied by the foot is a first force, and wherein the program instructions, when executed by the processor, further cause the robot to perform functions comprising:
  detecting, by the robot, an indication of a slip of a second foot of the robot;
  based on the detected indication of the slip, determining, by the robot, a second representation of a coefficient of friction between the foot and the ground surface, wherein the second representation is less than the first representation;
  based on the determined second representation and the determined representation of the gradient, determining a second threshold orientation for a second target ground reaction force on the foot of the robot on the ground surface during the footstep;
  determining the second target ground reaction force, wherein the second target ground reaction force comprises a magnitude and an orientation;
  determining a second adjusted ground reaction force by adjusting the orientation of the second target ground reaction force to be within the second threshold orientation; and
  before causing the foot of the robot to apply the first force on the ground surface approximately equal to and opposing the first adjusted ground reaction force during the footstep, causing the foot of the robot to apply a second force on the ground surface approximately equal to and opposing the second adjusted ground reaction force during the footstep.

* * * * *